(12) United States Patent
Ramos et al.

(10) Patent No.: US 12,026,744 B2
(45) Date of Patent: Jul. 2, 2024

(54) PROMPTING ITEM INTERACTIONS

(71) Applicant: International Business Machines Corporation, Armonk, NY (US)

(72) Inventors: Igor S. Ramos, Round Rock, TX (US); Kimberly J. Taft, Austin, TX (US); Devon E. Mensching, Austin, TX (US)

(73) Assignee: Internationa Business Machines Corporation, Armonk, NY (US)

( * ) Notice: Subject to any disclaimer, the term of this patent is extended or adjusted under 35 U.S.C. 154(b) by 0 days.

(21) Appl. No.: 16/427,586

(22) Filed: May 31, 2019

(65) Prior Publication Data

US 2020/0380561 A1  Dec. 3, 2020

(51) Int. Cl.
  *G06Q 30/00* (2023.01)
  *G06Q 30/0251* (2023.01)
  *G06Q 30/0601* (2023.01)
  *H04W 4/02* (2018.01)
  *H04W 4/23* (2018.01)

(52) U.S. Cl.
  CPC ..... *G06Q 30/0261* (2013.01); *G06Q 30/0631* (2013.01); *H04W 4/025* (2013.01); *H04W 4/23* (2018.02)

(58) Field of Classification Search
  CPC . G06Q 30/0261; G06Q 30/0631; H04W 4/23; H04W 4/025; H04W 4/021
  See application file for complete search history.

(56) References Cited

U.S. PATENT DOCUMENTS

| 7,155,401 B1 | 12/2006 | Cragun et al. | |
| 7,359,871 B1 | 4/2008 | Paasche et al. | |
| 10,210,542 B2 * | 2/2019 | Bass | G06Q 30/0252 |
| 11,100,539 B2 * | 8/2021 | Shiffert | G06Q 30/0267 |
| 2005/0228718 A1 * | 10/2005 | Austin | G06Q 30/0237 705/14.19 |
| 2007/0271141 A1 | 11/2007 | Storm | |
| 2010/0241495 A1 * | 9/2010 | Maniyar | G06Q 30/0207 705/14.1 |

(Continued)

FOREIGN PATENT DOCUMENTS

WO  WO2018213224 A1  11/2018

OTHER PUBLICATIONS

M. Alrubaian, M. Al-Qurishi, A. Alamri, M. Al-Rakhami, M. M. Hassan and G. Fortino, "Credibility in Online Social Networks: A Survey," in IEEE Access, vol. 7, pp. 2828-2855, 2019, doi: 10.1109/ACCESS.2018.2886314. (Year: 2018).*

(Continued)

*Primary Examiner* — Sun M Li
(74) *Attorney, Agent, or Firm* — Stephanie Carusillo; George S. Blasiak; Heslin Rothenberg Farley & Mesiti P.C.

(57) ABSTRACT

Methods, computer program products, and systems are presented. The method computer program products, and systems can include, for instance: responsive to a determination that a mobile client computer device is at a location of an item venue, sending to the client computer device prompting data, wherein the client computer device is associated to a user; examining feedback data defined by the user, wherein the feedback data is defined by the user in response to the prompting data; and transmitting to the mobile client computer device second prompting data in dependence on the examining feedback data defined by the user.

20 Claims, 10 Drawing Sheets

(56) References Cited

U.S. PATENT DOCUMENTS

| | | | |
|---|---|---|---|
| 2012/0278064 A1* | 11/2012 | Leary | G06F 40/253 704/9 |
| 2013/0103386 A1* | 4/2013 | Zhang | G06F 40/30 704/9 |
| 2013/0210463 A1* | 8/2013 | Busch | H04L 67/52 455/456.3 |
| 2013/0262203 A1 | 10/2013 | Frederick et al. | |
| 2014/0095148 A1* | 4/2014 | Berjikly | G06F 40/30 704/9 |
| 2014/0298364 A1* | 10/2014 | Stepanov | H04N 21/4668 725/10 |
| 2015/0112826 A1 | 4/2015 | Crutchfield, Jr. | |
| 2016/0171540 A1* | 6/2016 | Mangipudi | G06Q 30/0255 705/14.53 |
| 2017/0004535 A1 | 1/2017 | Weiss et al. | |
| 2017/0124575 A1* | 5/2017 | Clark | G06F 16/24578 |
| 2017/0193997 A1* | 7/2017 | Chen | G10L 13/08 |
| 2018/0276710 A1* | 9/2018 | Tietzen | G06Q 30/0269 |
| 2019/0108561 A1* | 4/2019 | Shivashankar | G06K 9/00624 |
| 2019/0141021 A1* | 5/2019 | Isaacson | G06F 16/951 |
| 2019/0261128 A1* | 8/2019 | Lyman | H04L 67/34 |
| 2019/0304007 A1* | 10/2019 | Parisis | G06Q 30/0633 |
| 2020/0090249 A1* | 3/2020 | Weislo | G06Q 30/0631 |

OTHER PUBLICATIONS

C. Chauhan and S. Sehgal, "Sentiment analysis on product reviews," 2017 International Conference on Computing, Communication and Automation (ICCCA), Greater Noida, India, 2017, pp. 26-31, doi: 10.1109/CCAA.2017.8229825. (Year: 2017).*

Wang Peng, Xu BaoWen, Wu YuRong, Zhou XiaoYu. Link Prediction in Social Networks: the State-of-the-Art. Sci China Inf Sci, 2015, 58: 011101(38), doi: 0.1007/s11432-014-5237-y, arXiv:1411.5118v2 [cs.SI] Dec. 8, 2014 (Year: 2014).*

A. C. Arulselvi, S. Sendhilkumar and S. Mahalakshmi, "Classification of tweets for sentiment and trend analysis," 2017 International Conference on Intelligent Computing and Control Systems (ICICCS), Madurai, India, 2017, pp. 566-573, doi: 10.1109/ICCONS.2017.8250525. (Year: 2017).*

A. Haripriya, S. Kumari and C. N. Babu, "Location Based Real-time Sentiment Analysis of Top Trending Event Using Hybrid Approach," 2018 International Conference on Advances in Computing, Communications and Informatics (ICACCI), Bangalore, India, 2018, pp. 1052-1057, doi: 10.1109/ICACCI.2018.8554457. (Year: 2018).*

P. Mell, et al. *The NIST Definition of Cloud Computing*", NIST Special Publication 800-145, Sep. 2011, Gaithersburg, MD.

* cited by examiner

PROMPTING ITEM INTERACTIONS

BACKGROUND

Location based services (LBS) are software services that use location data to control functionality of computer systems LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: responsive to a determination that a mobile client computer device is at a location of an item venue, sending to the client computer device prompting data, wherein the client computer device is associated to a user; examining feedback data defined by the user, wherein the feedback data is defined by the user in response to the prompting data; and transmitting to the mobile client computer device second prompting data in dependence on the examining feedback data defined by the user.

In another aspect, a computer program product can be provided. The computer program product can include a computer readable storage medium readable by one or more processing circuit and storing instructions for execution by one or more processor for performing a method. The method can include, for example: responsive to a determination that a mobile client computer device is at a location of an item venue, sending to the client computer device prompting data, wherein the client computer device is associated to a user; examining feedback data defined by the user, wherein the feedback data is defined by the user in response to the prompting data; and transmitting to the mobile client computer device second prompting data in dependence on the examining feedback data defined by the user.

In a further aspect, a system can be provided. The system can include, for example a memory. In addition, the system can include one or more processor in communication with the memory. Further, the system can include program instructions executable by the one or more processor via the memory to perform a method. The method can include, for example: responsive to a determination that a mobile client computer device is at a location of an item venue, sending to the client computer device prompting data, wherein the client computer device is associated to a user; examining feedback data defined by the user, wherein the feedback data is defined by the user in response to the prompting data; and transmitting to the mobile client computer device second prompting data in dependence on the examining feedback data defined by the user.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
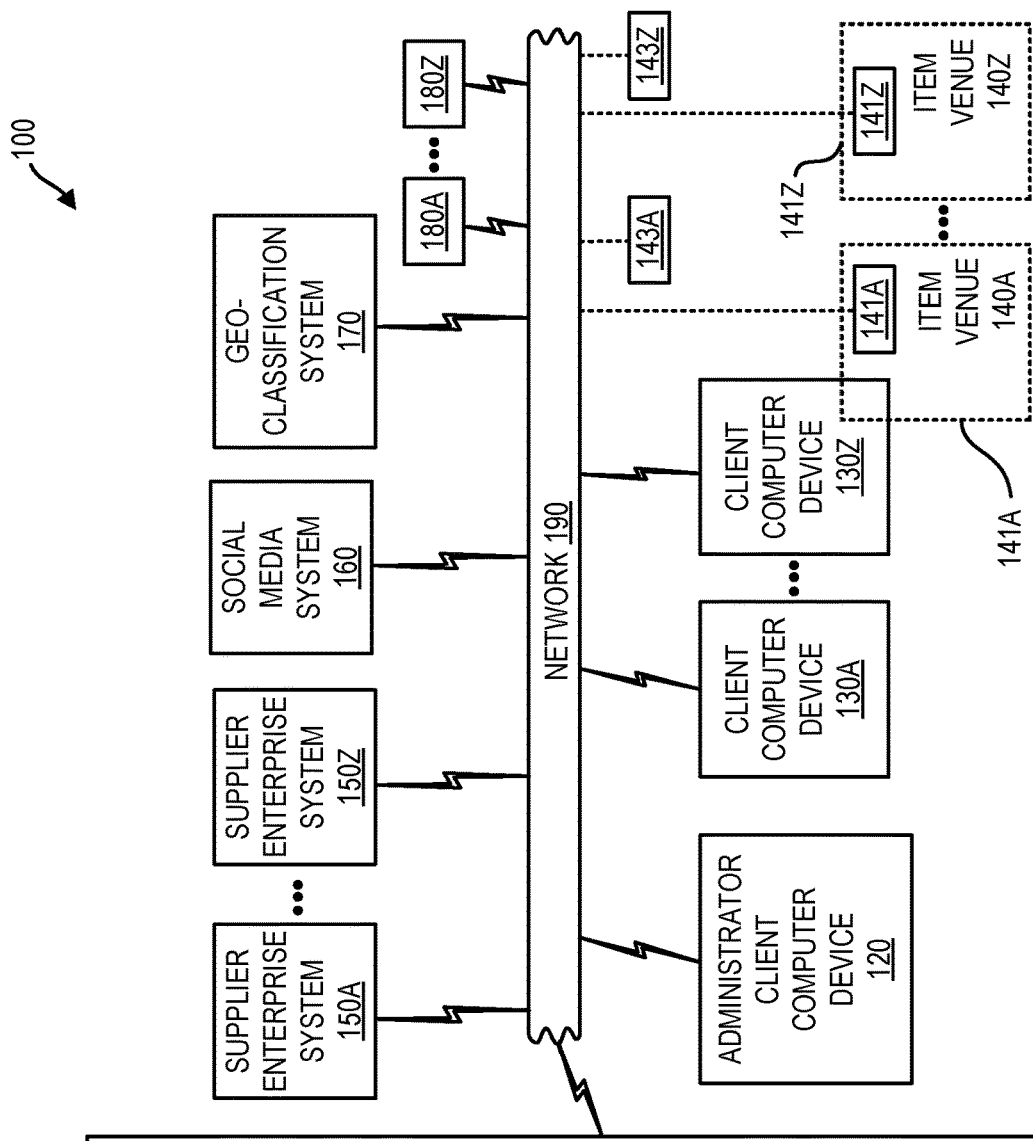
FIG. 1 depicts a system having an enterprise system, administrator client computer device, client computer devices, supplier enterprise systems, and a social media system according to one embodiment.

System 100 for use in discovering and satisfying user preferences is shown in FIG. 1. System 100 can include enterprise system 110 having an associated data repository 108, administrator client computer device 120, client computer devices 130A-130Z, item venues 140A-140Z, supplier enterprise systems 150A-150Z, social media system 160, geo classification system 170 and financial institution systems 180A-180Z. Enterprise system 110, administrator client computer device 120, client computer devices 130A-130Z, item venues 140A-140Z, supplier enterprise systems 150A-150Z, social media system 160, geo classification system 170 and financial institution systems 180A-180Z can be in communication with one another via network 190.

System 100 can include numerous devices which can be computing node based systems and devices connected by network 190 including enterprise system 110, administrator client computer device 120, client computer devices 130A-130Z, supplier enterprise systems 150A-150Z, social media system 160, geo classification system 170 and financial institution systems 180A-180Z. Network 190 can be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

According to one embodiment, enterprise system 110 can be external to administrator client computer device 120, client computer devices 130A-130Z, supplier enterprise systems 150A-150Z, social media system 160, geo classification system 170 and/or financial institution systems 180A-180Z. According to one embodiment, enterprise system 110 can be collocated with one or more of administrator client computer device 120, client computer devices 130A-130Z, supplier enterprise systems 150A-150Z, social media system 160, geo classification system 170 and/or financial institution systems 180A-180Z.

Item venues 140A-140Z can have associated thereto respective geofences 141A-141Z that specify respective geospatial e.g. coordinate locations of the respective item venues. There can be disposed in respective item venues 140A-140Z respective venue systems 142A-142Z which can be computing node base systems (e.g. store servers in one embodiment) which can be in communication with associated item venue enterprise systems 143A-143Z. Item venue enterprise systems 143A-143Z can be associated to respective item venue enterprises that operate the respective item venues 140A-140Z. Such item venue enterprises can be brick and mortar retailer enterprises that operate item venues in the form of brick and mortar retail stores which can be defined by item venues 140A-140Z. Respective item venues 140A-140Z can have respective geofences 141A-141Z that define a geospatial location of the respective item venues. Venue systems 142A-142Z and item venue enterprise systems 143A-143Z are shown as connected to networks 190 with dashed lines to highlight that in one embodiment, there are no shared data communications between Venue systems 142A-142Z and enterprise system 110 and no shared data communications between item venue enterprise systems 143A-143Z and enterprise system 110.

Client computer devices 130A-130Z can be mobile computer devices, moveable between locations, internal and external to respective item venues 140A-140Z, and thus client computer device 130Z is shown in FIG. 1 as being partially disposed within geofence 141A.

Client computer devices 130A-130Z can be wireless computer devices that can be connected to network 190 by alternative radio communication protocols. For example, client computer devices 130A-130Z can connect to network 190 by first connection nodes (not shown). The first connection nodes can be connection nodes that facilitate connection to a cellular communication network. Client computer devices 130A-130Z can also be connected to network 190 via second connection nodes (not shown). The second connection nodes can be provided by IEEE 802.11 access points of a WIFI wireless network provided by an operator of an item venue. Enterprise system 110 can at all times receive location data that specifies respective locations of client computer devices 130A-130Z, e.g. where users of the respective client computer devices have consented to sharing their location. The location data can be received from one or more locating service that uses radiofrequency signals received by the first connection nodes and/or second connection nodes. Additionally, or alternatively, respective client computer devices 130A-130Z can include respective radiofrequency signal receiving Global Positioning System (GPS) sensors which provide the respective computer devices the ability to report location data specifying respective current location of the respective computer devices to enterprise system 110.

Social media system 160 can include a collection of files, including for example, HTML files, CSS files, image files, and JavaScript files. Social media system 160 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that have minimal or no social network attributes. A messaging system can be provided by a short message system (SMS) text message delivery service of a mobile phone cellular network provider, or an email delivery system. Enterprise system 110 can include a messaging system in one embodiment. During a process of registration wherein a user of system 100 registers as a registered user of system 100, a user sending registration data can send with permission data defining the registration data a permission that grants access by enterprise system 110 to data of the user within social media system 160. On being registered, enterprise system 110 can examine data of social media system 160 e.g. to determine whether first and second users are in communication with one another via a messaging system of social media system 160. A user can enter registration data using a user interface displayed on a client computer device of client computer devices 130-130Z. Entered registration data can include e.g. name, address, social media account information, other contact information, biographical information, background information, preferences information, and/or permissions data e.g. can include permissions data allowing enterprise system 110 to query data of a social media account of a user provided by social media system 160 including messaging system data and any other data of the user. When a user opts-in to register into system 100 and grants system 100 permission to access data of social media system 160, system 100 can inform the user as to what data is collected and why, that any collected personal data may be encrypted, that the user can opt out at any time, and that if the user opts out, any personal data of the user is deleted.

Embodiments herein recognize that with diminishing instances of item venues, such as retail product venues, there are diminishing opportunities for users to discover new item preferences. Embodiments herein recognize that online retailers may attempt to replicate traditional physical item discovery processes through virtualization, e.g. presenting to their customer users item presentments associated to new physical items. However, embodiments herein recognize that such attempts at virtualization cannot replicate the experience of physical engagement with an item.

System 100 can be configured to prompt for user engagement with physical items so that data can be obtained, which can be subject to processing for determination of user preferences in respect to physical items. System 100 can further be configured with features, including artificial intelligence (AI) features to satisfy user preferences once those preferences have been determined.

According to one aspect, system 100 can be configured to sense a location of a client computer device of client computer devices 130A-130Z in respect to an item venue of item venues 140A-140Z. In response to client computer device being determined to be at a location of an item venue, e.g. breaching a geofence 141A-141Z associated with a respective one of item venues 140A-140Z, system 100 can send prompting data to the client computer device, prompting the user associated to the client computer device to engage with a physical product. The engagement can include, e.g. purchase of a physical product.

According to one embodiment, an enterprise associated with enterprise system 110 can be different from respective enterprises operating respective item venues 140A-140Z. According to one embodiment, enterprise system 110 can be associated to and operated by an enterprise and an item venue can be operated by a second enterprise different from the enterprise. System 100 can be configured so that the enterprise of enterprise system 110 can advantageously prompt the user to engage with physical items other than physical items made available for engagement by the enterprise. Accordingly, embodiments herein facilitate encouraging a user to engage and discover physical items without procurement of or providing of such items. Embodiments herein accordingly expand an enterprise's ability to prompt for user engagement with physical items.

Data repository 108 can store various data. Data repository 108 in users area 2121 can store data on users of system 100. Users of system 100 can include registered users who have subscribed to services made available by enterprise system 110. In response to receipt of registration data from a user, enterprise system 110 can assign a Universally Unique Identifier (UUID) to each new user.

Data repository 108 in user actions area 2122 can store data on actions of users. For example, action of a user can specify actions of a user in response to receipt of prompting data sent to a user by enterprise system 110. Such actions can include, e.g. redeeming a credit, a social media "like", text data having positive or negative sentiment, and/or failing to respond to prompting data, e.g. by a timeout.

Data repository 108 in user profiles area 2123 can store data specifying profiles of various users. Profiles of various users can include data specifying preferences of users including item classification preferences of users. Classifications of items can include, e.g. baked good, books and newspapers, bulk dried foods, canned goods, confections and candies, cosmetics, dairy product, flowers, frozen foods, laundry products, meats, fish and seafood, medicines, grooming products, pet products, seasonal items, snack foods, hot beverages, clothing, shoes, accessories, electronics, toys, sporting goods, and the like. Classifications can include species classifications and/or a generic classification. For example, cookies can be classified cookies (species) and as baked goods (generic).

Data repository 108 in item venues area 2124 can store a list of item venues, e.g. retail store venues that can be used according to features herein, system 100 can use item venues, such as retail stores, for facilitating engagement of customer users with physical items such as retail products. Item venues provided by retail stores can include, e.g. convenience stores, drug stores, supermarkets, department stores, and specialty stores. According to one embodiment, enterprise system 110 can be authorized by an enterprise other than an enterprise associated to the item venues of item venues area 2124. According to one aspect, enterprise system 110 can prompt a customer user of a first enterprise to engage with physical items, e.g. through purchase located within an item venue operated by a second enterprise.

Enterprise system 110 can be configured to identify item venues by querying geo classification system 170 which can store tags that specify venue classifiers associated to venues, e.g. can include classifiers indicating that a venue is a retail store. Enterprise system 110 can filter candidate item venues so that data only for qualifying item venues is included within item venue areas. Enterprise system 110 according to one embodiment can apply the qualifying criterion e.g. that an item venue is a top K selling retail chain in a specified item venue classification for a geographical region (e.g. national or local). For determination that a retail store venue is a top selling retail chain enterprise system 110 can iteratively automatically query one or more data source. For identification of such one or more data source, enterprise system 110 can iteratively automatically run search engine queries such as "top selling [item venue classification] in [region specifier]". Embodiments herein recognize that where an item venue operated by a top K retailer can be assumed to stock top M selling items in an item classification.

Data repository 108 in item venue locations area 2125 can store data on respective locations of various item venues that can be provided by retail stores. According to one embodiment, item venue locations area 2125 can store a geofence defined by a perimeter associated to respective item venue locations. Enterprise system 110 can determine that a user is at a location of an item venue by examining a user's location with reference to a geofence associated to an item venue location. Enterprise system 110 can look up locations of item venues from geo classification system 170.

Data repository 108 in item venue inventory area 2126 can store data on inventory items of item venues referenced in item venues area 2124. According to one embodiment, data repository 108 may not include complete or accurate data of an item of an item venue's inventory, which is expected since in one embodiment, the enterprise authorizing processes of enterprise system 110 can be unaffiliated with the enterprises operating respective ones of item venues referenced in item venues area 2124.

Data repository 108 in enterprise inventory area 2127 can store data on a current inventory of an enterprise associated to enterprise system 110. According to one embodiment, an enterprise associated to enterprise system 110 can be an online retailer enterprise system. The online retailer enterprise system, according to one embodiment, can be absent of any associated physical "brick and mortar" retail stores and in one embodiment can have a limited number of "brick and mortar" retail stores. Accordingly, embodiments herein can be advantageous for use of such enterprise systems so that customers of such enterprises can be prompted to engage with physical items, e.g. retail goods, without the enterprise providing access to such physical items. The enterprise associated to enterprise system 110 can prompt its customer users to engage with a physical item located at an item venue operated by a second enterprise.

The inventory data of enterprise inventory area 2127 can include data of items previously shipped to the enterprise of enterprise system 110 and which are ready to deliver to customer users the enterprise of enterprise system 110 by the enterprise of enterprise system 110.

Data repository 108 in suppliers area 2128 can store data on suppliers that supply physical items to an enterprise associated to enterprise system 110, which enterprise can be, e.g. an online retailer. An online retailer e.g. can store physical items, e.g. in a series of warehouses, and data on such stored items can be stored in enterprise inventory area 2127. Data of suppliers in suppliers area 2128 can store data on inventory of supplier enterprises that supply items to the enterprise of enterprise system 110 which enterprise can be an online retailer.

Data repository 108 in supplier inventory area 2129 can store data on an inventory of items of suppliers that supply items to the enterprise of enterprise system 110. Data of supplier inventory area 2129 can be data specifying an inventory of items available from respective suppliers references in suppliers area 2128.

Data repository 108 in item venue inventory area 2126 can store data on an inventory of items at respective item venues 140A-140Z. The data of item venue inventory area 2126 can be informal inventory data that can be inferred rather than determined based on factual e.g. delivery receipt data. The data of item venue inventory area 2126 can be informal, inferred, imprecise and/or incomplete as can be expected since an enterprise of enterprise system 110 can, in one embodiment, have no affiliation to enterprises referenced in item venues area 2124 and operating respective item venues 140A-140Z. According to one embodiment, the data of item venue inventory area 2126 can be inferred and defined in one example based on commonly known items expected to be available from a type of item venue, e.g. convenience store, drug store, supermarket, department store, sporting goods store, and the like.

According to one embodiment, enterprise system 110 for determination of informal inferred inventory data associated to an item venue for storage into item venue inventory area 2126 can automatically and iteratively query one or more online data source that specify top-selling items at the regional location of a venue for various item classifications. For identification of such one or more data source, enterprise system can automatically iteratively run a search engine query such as "top selling [item classification] in [region specifier]" According to one example, an administrator user using administrator client computer device 120, according to one example, can manually build or augment an item list of items and store such reference list in item venues inventory area 2126 by manual research of top selling items in various item classifications, which items are expected to be available in an item venue of a certain item venue classification, e.g. convenience store, drug store, supermarket, department store, sporting goods store, and the like.

Enterprise system 110 performing examining item venue inventory performing block 1110 can include enterprise system 110 activating redemption promotion generation process 113 as described in connection with FIG. 1.

Data of item venues inventory area 2126, according to one embodiment, can also include data based on processing purchase data of registered users of an enterprise associated to enterprise system 110.

Enterprise system 110 can run various processes, including, preparation and maintenance process 111, provider item identification process 112, redemption promotion generation process 113, and item acquisition promotion generation process 114.

Enterprise system 110 running preparation and maintenance process 111 can include enterprise system 110 receiving data from various data sources, such as administrator client computer device 120, client computer devices 130A-130Z, supplier enterprise system 150A-150Z, social media system 160, and geo classification system 170. Enterprise system 110 running preparation and maintenance process in some instances can receive data from the noted data sources in unstructured form and can process such data to return structured data for storage into various area of data repository 108 such as areas 2121-2129.

Enterprise system 110 running provider item identification process 112 can examine various data for return of an item identification, the item identification specifying an item to be subject to a promotion. Enterprise system 110 running provider item identification process 112 can identify an item for promotion that is available from the enterprise associated to enterprise system 110, e.g. an online retailer. An item available from a certain enterprise associated to enterprise system 110 can include e.g. items currently within an inventory of the certain enterprise, or accessible by the certain enterprise from a supplier of the certain enterprise. For performing provider item identification process 112, enterprise system 110 can examine, e.g. data of enterprise inventory area 2127 and/or data of supplier inventory area 2129 to identify an item for promotion. An item for promotion, in one example, can be an overstocked item. An overstocked item can be for example an overstocked item of an enterprise associated to enterprise system 110. An overstocked item can be for example an overstocked item of a supplier. Enterprise system 110 running provider item identification process 112 can examine configuration data defined by an administrator user of a supplier. The configuration data can specify, for example, that a certain item available from a supplier to a customer via the enterprise associated to enterprise system 110 is to be subject to a promotion. Such promotion can be, e.g. a promotion to make available the item via a recurring order.

Enterprise system 110 running redemption promotion generation process 113 can include enterprise system 110 generating a redemption promotion. As set forth herein, a redemption promotion can be a promotion by an enterprise associated to enterprise system 110 to prompt a customer user of the enterprise to acquire a physical item made available by a second enterprise different from the enterprise. A promotion can be regarded as a redemption promotion, because as part of the promotion in one embodiment, the customer user of the enterprise can redeem a credit on acquisition of the item from a second enterprise different from the enterprise. The second enterprise, according to one embodiment, can be an enterprise associated with an item venue such as a retail store as set forth herein. Enterprise system 110 running redemption promotion generation process 113 can include enterprise system 110 examining an item classification of the item identified by provider item identification process 112 in connection with item classifications of items referenced in item venue inventory area 2126. According to one embodiment, enterprise system 110 running redemption promotion generation process 113 can generate a promotion to prompt a customer user to acquire from an item venue at which the customer user is located, an item, the item having an item classification in common with the item identified by enterprise system 110 running provider item identification process 112.

According to one embodiment, enterprise system 110 running redemption promotion generation process 113 can include enterprise system 110 identifying an item of a classification specified within item venue inventory area 2126 for the venue at a current location of a customer user having an item classification complimentary to the classification of the item identified by the provider item identification process 112. In such a scenario, for example, the provider item identification process 112 can identify an item with the product classification of "baked goods" and the classification of an item identified that is specified in item venue inventory area 2126 can be the common classification "baked goods".

Referring to provider item identification process 112 and redemption promotion generation process 113, enterprise system 110 can identify an item for promotion that is available from an enterprise, e.g. in inventory of the enterprise, or available from a supplier and in response to the identification of an item for promotion, enterprise system 110 running redemption promotion generation process 113 can identify an item within an item venue inventory, e.g. a retail store operated by an enterprise other than the enterprise associated to enterprise system 110 in common with the classification of the item identified by the provider item identification process, or complimentary with that classification. Enterprise system 110 can prompt the customer user to engage, e.g. by acquisition of the item at the item venue so that preferences of the customer user are learned and information of the customer user preferences can be processed for determining whether the customer use is a candidate for receipt of an item acquisition promotion.

Enterprise system 110 running item acquisition promotion generation process 114 can generate a promotion to promote the acquisition of an item by a customer user made available to the customer user by the enterprise associated to enterprise system 110. Enterprise system 110 running item acquisition promotion generation process 114 can send promotion data to a customer user in dependence on actions of the customer user in response to the customer user previously receiving redemption promotion data, specifying a redemption promotion generated by enterprise system 110 running redemption promotion generation process 113.

Enterprise system 110 can run NLP process 115 to process data for preparation of records that are stored in data repository 108 and for other purposes. Enterprise system 110 can run a Natural Language Processing (NLP) process 115 for determining one or more NLP output parameter of a message. NLP process 115 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter. By running of NLP process 115 enterprise system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message. Topic analysis for topic classification and output of NLP output parameters can include topic segmentation to identify several topics within a message. Topic analysis can apply a variety of technologies e.g. one or more of Hidden Markov Model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." Enterprise system 110 running NLP process 115 can include enterprise system 110 returning NLP output parameters in addition to those specification topic and sentiment, e.g. can provide sentence segmentation tags, and part of speech tags. Enterprise system 110 can use sentence segmentation parameters to determine e.g. that an action topic and an entity topic are referenced in a common sentence for example.

Geo classification system 170 can associate venues to spatial coordinate ranges associated to the venues. Geo classification system 170 can include enhanced spatial maps pre-marked with tags to indicate uses associated with map features. Map features can include venues having associated venue areas including venue building areas and/or associated venue parking areas. An enhanced map can include tag specifying usage classifications of venues, e.g. residential, business, public and the like. Geo classification system 170 can tag a venue with data that specifies that the venue is a retail store which can define an item venue herein. An enhanced map can be tagged to tag features of a map including e.g. roads, bodies of water and infrastructure features such as building walls (exterior and interior) defining enterprise venues. In some cases, an enhanced map can be tagged so that that different parts of a building are tagged differently, e.g. a doorway can be tagged differently from a conference room. Geo classification system 170 can provide data tags associated to locations that specify uses associated with various locations. Geo classification system 170 can cognitively map venues identified by venue identifiers, e.g. names, addresses, classifications, and the like, to coordinate location ranges associated to the various venues. Accordingly, enterprise system 110 querying geo classification system 170, with location data in the form of coordinate location data, can return an identifier venue. Further, geo classification system 170 can cognitively map venues that are listed in geo classification system with uses associated with such venues, e.g. whether such venues are for residential use or business use and include a variety of additional or alternative use classifications, e.g. public use, roadway use, waterway use, and the like. An enhanced map can be tagged to tag features of a map, including e.g. roads, bodies of water and venues. Venues can be provided e.g. by open spaces, such as developed open spaces or undeveloped open spaces, buildings such as open roof building or closed roof buildings, and/or open spaces associated to buildings, such as building associated with a parking lot. For each venue, geo classification system 170 can associate e.g. identifiers for the venue, ranges and coordinate locations associated with the venue, features associated to the venue, such as building infrastructure features, parking lot features, and other features. Geo classification system 170 according to one embodiment can be provided by GOOGLE MAPS® (GOOGLE MAPS® is a registered trademark of Google, Inc.).

Figure 2:
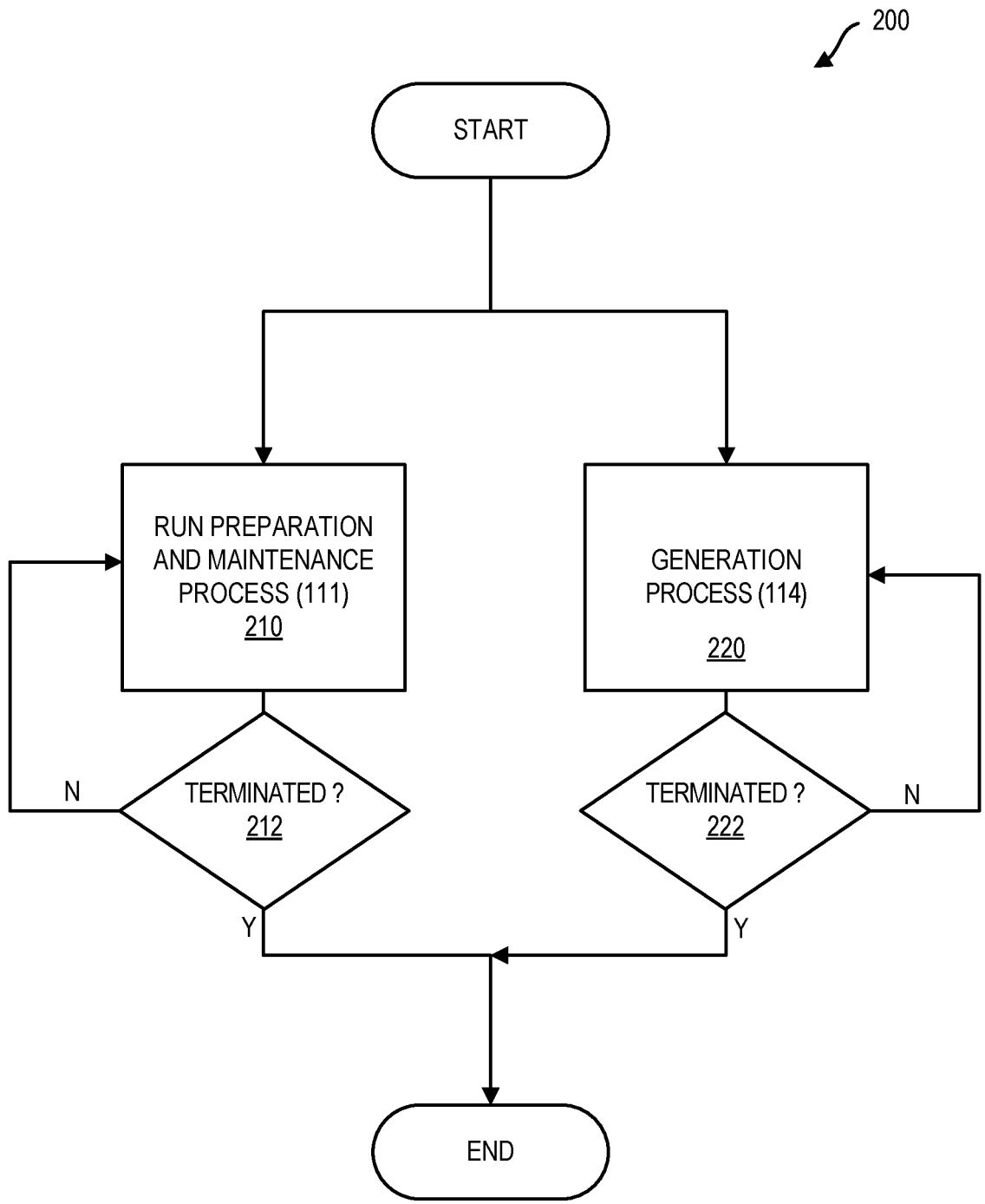
FIG. 2 is a flowchart illustrating a method for performance by an enterprise system according to one embodiment.

The flowchart of FIG. 2 illustrates a process for performance by enterprise system 110 associated to an enterprise, such as an online retailer. FIG. 2 is a flowchart illustrating coordination of processes that can be performed by enterprise system 110 of FIG. 1, in accordance with one or more embodiments set forth herein.

At block 210, enterprise system 110 can run preparation and maintenance process 111 to populate prepare and maintain various data of data repository 108 including data of areas 2121-2129. Enterprise system 110 can run preparation and maintenance process 111 iteratively until process 111 is terminated at block 212.

At block 220, enterprise system 110 can run action decision process 116. For support of running of action decision process 116 iteratively, enterprise system 110 can be running e.g. NLP process 115, event profiling process 114, qualifying process 115, and/or machine learning process 117 iteratively. Enterprise system 110 can run action decision process 116 until action decision process 116 is terminated at block 222. Enterprise system 110 can run preparation and maintenance process 111 and action decision process 116 concurrently and can run each of process 111 and process 116 iteratively.

Figure 3:
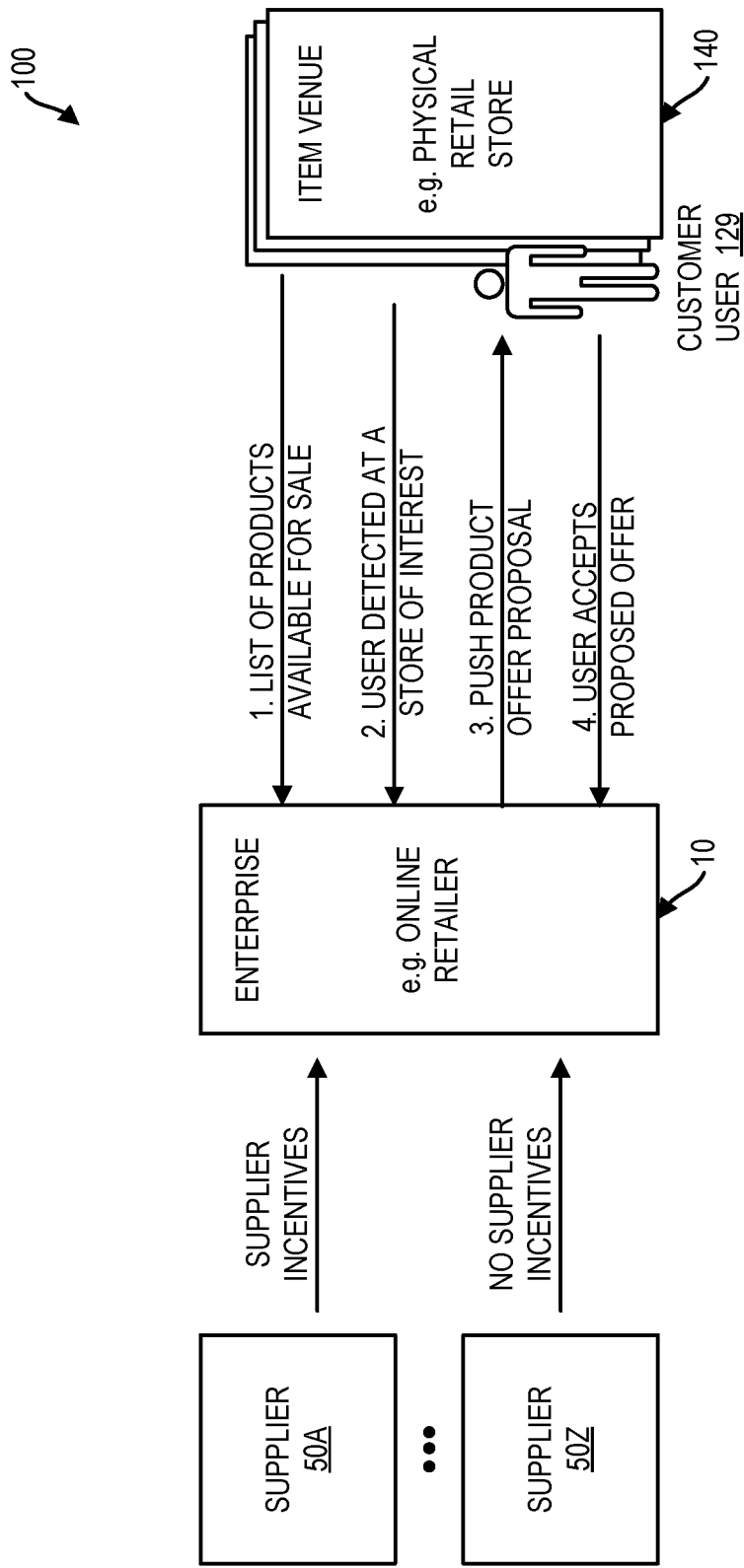
FIG. 3 is a flowchart of a schematic diagram illustrating aspects of the system according to one embodiment.

FIG. 3 is a schematic diagram illustrating interactions between enterprises and a customer user in accordance within system 100. Referring to FIG. 3, enterprise 10 can interact with a customer user 129 who can have an associated client computer device of client computer devices 130A-130Z as shown in FIG. 1. In some embodiments, enterprise 10 can also interact with suppliers 50A-50Z which can be associated to respective supplier enterprise systems 150A-150Z. Referring to FIG. 3, in connection with FIG. 1, enterprise 10 can be the enterprise associated to enterprise system 110 and suppliers 50A-50Z can be associated, respectively, to supplier enterprise systems150A-150Z as shown in FIG. 1. As set forth herein, enterprise 10 according to one embodiment, can generate promotions referred to as redemption promotions that prompt a customer user 129 to engage, e.g. by acquisition with a physical item in an item venue 140, e.g. a physical retail store, wherein the item venue 140 is unaffiliated with enterprise 10 and is operated by a second enterprise other than enterprise 10.

Referring to FIG. 3, enterprise 10 at 1 can examine a list of inventory items, e.g. products available at item venue 140. As described in connection with FIG. 1, the inventory list can be an inferred list, not based on actual inventory data. At 2, enterprise 10 can detect that customer user 129 has moved to a location of item venue 140, e.g. enterprise 10 at 2 can determine that customer user 129 has breached a geofence associated to item venue 140. At 3, enterprise 10 can push a promotion, e.g. a product offer proposal, to customer user 129 based on the examination of a list of items at 1. At 4, customer user 129 can accept the proposal sent at 3. Enterprise 10, by enterprise system 110, can then in turn examine data of the acceptance to determine a preference of the user and can send one or more follow up set of promotion data to customer user 129 in dependence on the determined preference.

System 100 can include one or more suppliers 50A-50Z interacting with enterprise 10. For example, in accordance with the schematic diagram of FIG. 3, supplier 50A can be providing to enterprise 10, supplier incentives, e.g. in the form of credits such as monetary credits in exchange for enterprise 10 featuring items available from supplier 50A to enterprise 10. Based on supplier 50A providing supplier incentives to enterprise 10, enterprise 10 can prioritize specified promotions of supplier 50A over other suppliers.

For prioritizing supplier 50A over other suppliers, such as supplier 60Z, enterprise 10 can prioritize actions to discover preferences of customer users in respect to items made available from supplier 50A, such as items specified for promotion by supplier 50A or items available from the inventory of supplier 50A. In the embodiment of FIG. 3, supplier 50A can provide supplier incentives to enterprise 10 and supplier 60Z and in the described example, supplier 50Z does not provide supplier incentives to enterprise 10. Accordingly, in respect to its functions to send redemption promotion prompts to customer users of system 100, enterprise 10 can prioritize the sending of prompts for sending of redemption promotions with prompts to encourage discovery by customer users of physical items having item classifications in common with, or complimentary to, items made available by supplier 50A.

Referring to FIG. 3, a user 129 can agree to install an application of enterprise 10 on their client computer device e.g. smartphone. In another embodiment another application, such as a mapping application, can be extended to support the application, such that there's no need for additional application installation.

The user 129 can agree to share their location with enterprise 10, so that the enterprise 10 becomes aware of the user entering into an item venue 140. As depicted by ARROW 1 enterprise 10 can obtain a list of physical items e.g. products available for sale at physical retailers. The list can be obtained via an application programming interface (API), inference, or other methods. Enterprise 10 can receive geo coordinates of user location, and then use that location to map to an item venue 140 such as a physical store. Enterprise 10 can use the store name to resolve to a list of items e.g. products offered by that store, given its classification. i. For example: User A's geo coordinates are 30.398093, ¬97.705173, which resolves to address 11800 Metric Blvd, Austin, Tex. 78758, which corresponds to an ABC convenience store. It can be inferred that this store carries certain brands of drinks, candies, or other items. According to one embodiment supplier 50A may provide incentives for enterprise 10 to promote items supplier by supplier 60Z. The feature replications the advantages yielded in the physical retailing industry as suppliers buying shelf space, and in online commerce, buying screen time. In the described example of FIG. 3, supplier 50B also supplies items to enterprise 10 but chooses not to provide incentives to enterprise 10.

When user 129 arrives at a location of item venue 140 e.g. provided by a physical store, the installed application of the user's client computer device can broadcast the location of the client computer device to enterprise 10 associated to enterprise system 110 (Arrow 2). Enterprise system 110 can then perform a look up to see if that item venue matches a store of interest. Then enterprise system 110 can consider user preferences, and available supplier incentives, and can decide if a promotional offer should be proposed to the user 129 at item venue 140. To determine preference of a user 129, enterprise 10 can examine feedback data of the user including previous purchases of user 129 and determine product affinity (whether the user has positive preference for items classified in common with the item for promotion). For example: A bought a chocolate bar 5 times over the past 6 months, so he's a good candidate for chocolate bar offers. The promotional offer can combine incentives of a supplier and enterprise 10, and prompting promotional data defining an offer (Arrow 3) can be presented to the user's client computer device. An offer can be as follows: i. Example 1: "Hello A! We see you're at ABC store. Grab a free MAG- ICBAR Chocolate on us! Purchase it and we'll credit your account". Then, if user 129 accepts the offer enterprise system 110 of enterprise 10 can: Credit the user's account with a $3.00 credit and e.g. in two hours can send a text based message as follows: "how did you like the MAGIC-BAR Chocolate?"; and offer to add to the recurring cart. Get 20% when you do a "MAGICBAR Chocolate recurring subscription" Another offer can be as follows: ii. "Hello A! We see you're at ABC store. Get a free MAGICBAR if you Subscribe for recurring orders! Click below to sign up for a recurring order." In another embodiment, a certain enterprise 10 operating item venue 140 can have registered to receive services described from enterprise system 110 of enterprise 10 wherein enterprise system 110 prompts a user to acquire items from item venue 140. In such an embodiment, the certain item venue enterprise operating item venue 140 can grant permissions to enterprise system 110 so that enterprise system 110 can send text based messages to displays within item venue 140. In such an embodiment, enterprise 110 can send the described text based prompts to a display of item venue for viewing by user 129, e.g. point of sale (POS) display.

Figure 4:
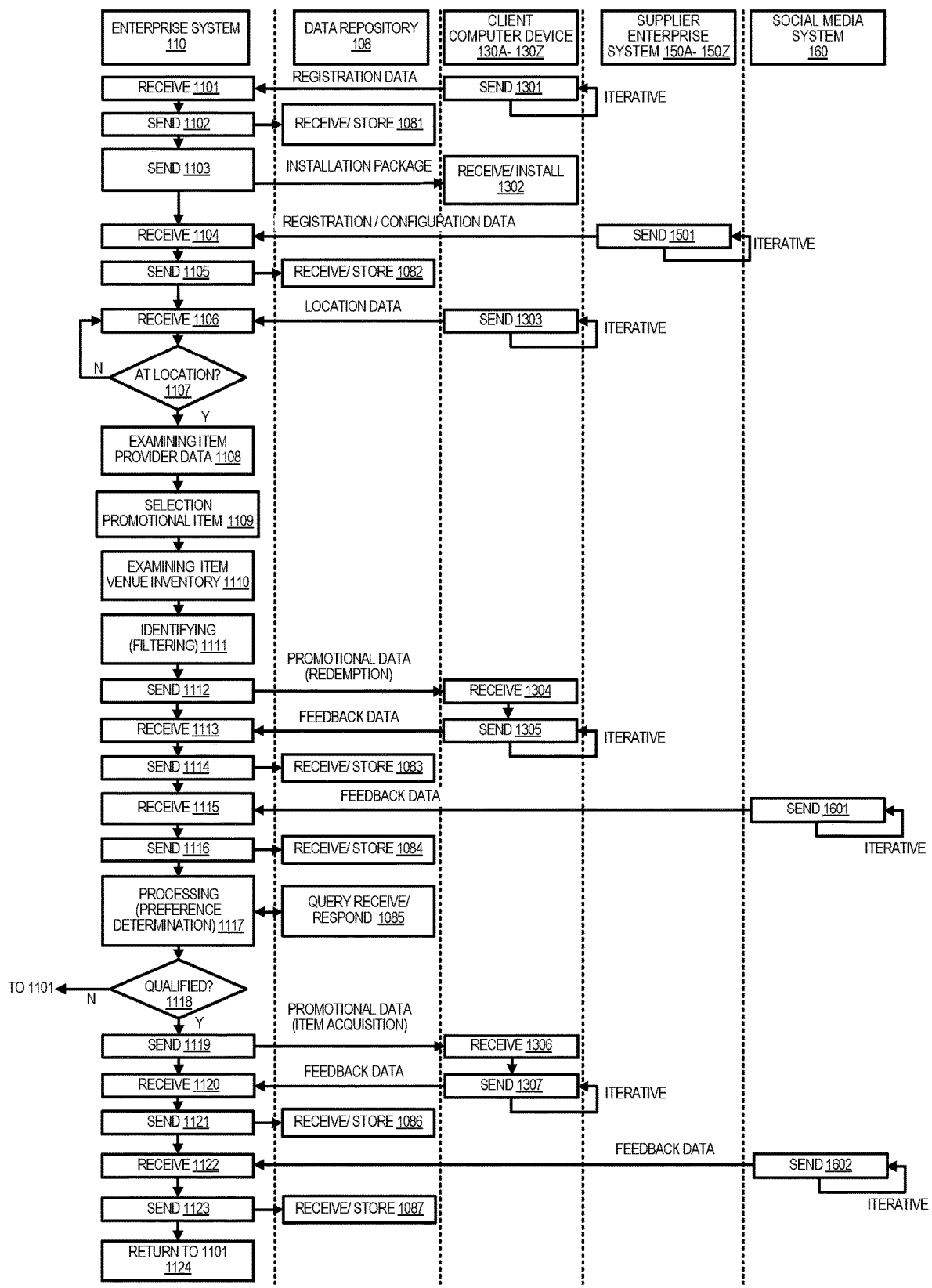
FIG. 4 is a flowchart illustrating a method for performance by an enterprise system interoperating with other components of the system according to one embodiment.

The flowchart of FIG. 4 illustrates a method for performance by enterprise system 110 interacting with client computer devices 130A-130Z, supplier enterprise systems 150A-, 150Z, and social media system 160. According to the method of the flowchart of FIG. 4, enterprise system 110 can identify an item for promotion based on the identified item for promotion enterprise system 110 can prompt customer users to discover items compatible with the identified item. A compatible item can be, e.g., an item having a common item classification or complementary item classification with an identified item of the one or more item identified at block 1109. The prompting of users to discover compatible items can be with use of item venues such as "brick and mortar" retail stores operated by enterprises other than the enterprise associated to enterprise system 110. With preferences of the prompted users being determined, particular ones of the customer users can be selected for receipt of an item acquisition promotion for acquisition of the identified item.

Referring to the flowchart of FIG. 4 users of client computer devices 130A-130Z can be sending registration data iteratively at block 1301 for iterative receipt by enterprise system 110 at receive block 1101. In response to performance of receive block 1101, enterprise system 110 can proceed to block 1102 to send received registration data to data repository 108 for performance by data repository 108 at block 1081. At block 1081, data repository 108 can store received registration data into data repository 108 to setup user accounts for registered users.

Figure 6:
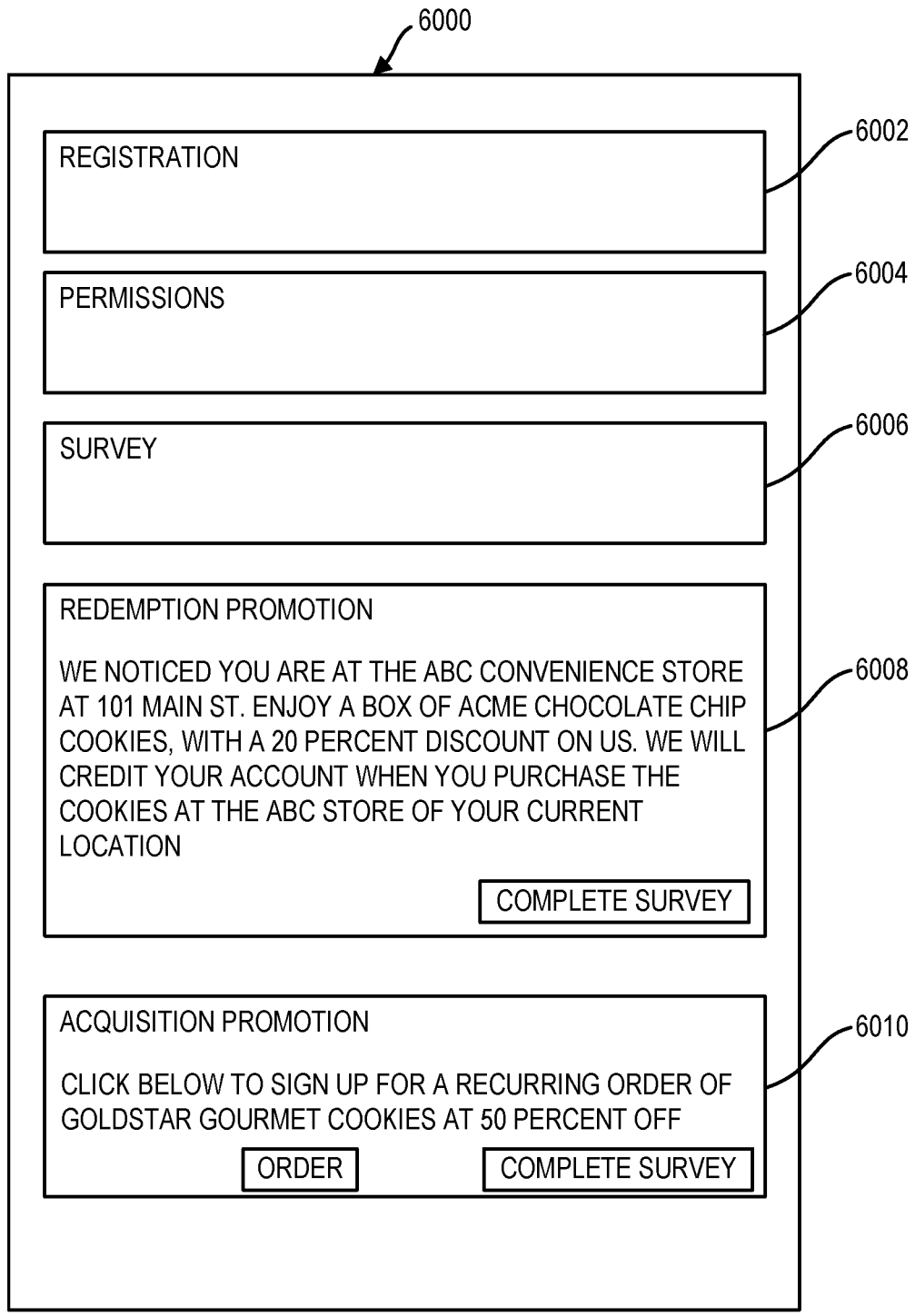
FIG. 6 depicts a customer user interface according one embodiment.

According to one embodiment, an enterprise associated to enterprise system 110 can be an online retailer which can have physical item venues, i.e., retail stores associated therewith, but in one embodiment can be an online retailer without any or with limited associated item venues in the form of retail stores. Registered users of enterprise system 110 can be customer users of the enterprise associated to enterprise system 110, i.e. customers of an online retailer in one embodiment. Registration data can be entered with use of a user interface 6000 as shown in FIG. 6, which user interface 6000 can be displayed on a display of respective client computer devices 130A-130Z.

In area 6002, a customer user can enter registration data, i.e. name, contact information, email address data, social media account data, a password, and the like. In response to the receipt of registration data, enterprise system 110 can set up an account for the user and assign a Unique Universal Unique Identifier (UUID) for each registered user, which with registration data sent at block 1301, there can be sent registration data in the form of permissions data. In permissions area 6004 a customer user can define permissions, such as permissions to allow enterprise system 110 to monitor location of the user, permissions to obtain data from social media system 160, and permissions to obtain payment data of a payment system module associated to social media system 160. In response to sending registration data, including permissions registration data, to data repository 108, at block 1102 enterprise system 110 can proceed to block 1103.

At block 1103 enterprise system 110 can send an installation package to client computer devices of client computer devices 130A-130Z that are associated to newly registered user. In response to the receipt of an installation package at block 1302 respective client computer devices of client computer devices 130A-130Z can install the installation package. An installation package can include e.g. libraries and executable code that facilitate the participation of a customer user in system 100. The installed software at block 1302 can include, for example, software that facilitates the sending of location data by a client computer device to enterprise system 110, and in some cases permits a client computer device to examine location data of the client computer device in respect to geofences associated to respective item venues as set forth herein.

In another embodiment, enterprise system 110 can examine location data of respective client computer devices of client computer devices 130A-130Z in reference to geofences associated to various item venues as can be referenced in item venues area 2124. The software installed at block 1302 can facilitate additional functionalities such as the receipt of messages such as text based messages from enterprise system 110 via messaging system such as a messaging system provided as part of social media system 160. Such a messaging system can facilitate the sending of promotional data from enterprise system 110 to client computer devices 130A-130Z. In response to completion of block 1104, enterprise system 110 can proceed to block 1104.

At block 1104, enterprise system 110 can be receiving registration data and/or configuration data from supplier enterprise systems 150A-150Z which can be sending registration data and/or configuration data iteratively at block 1501. In response to the receipt of registration data and/or configuration data from suppliers at block 1104 enterprise system 110 can proceed to block 1105.

Figure 7:
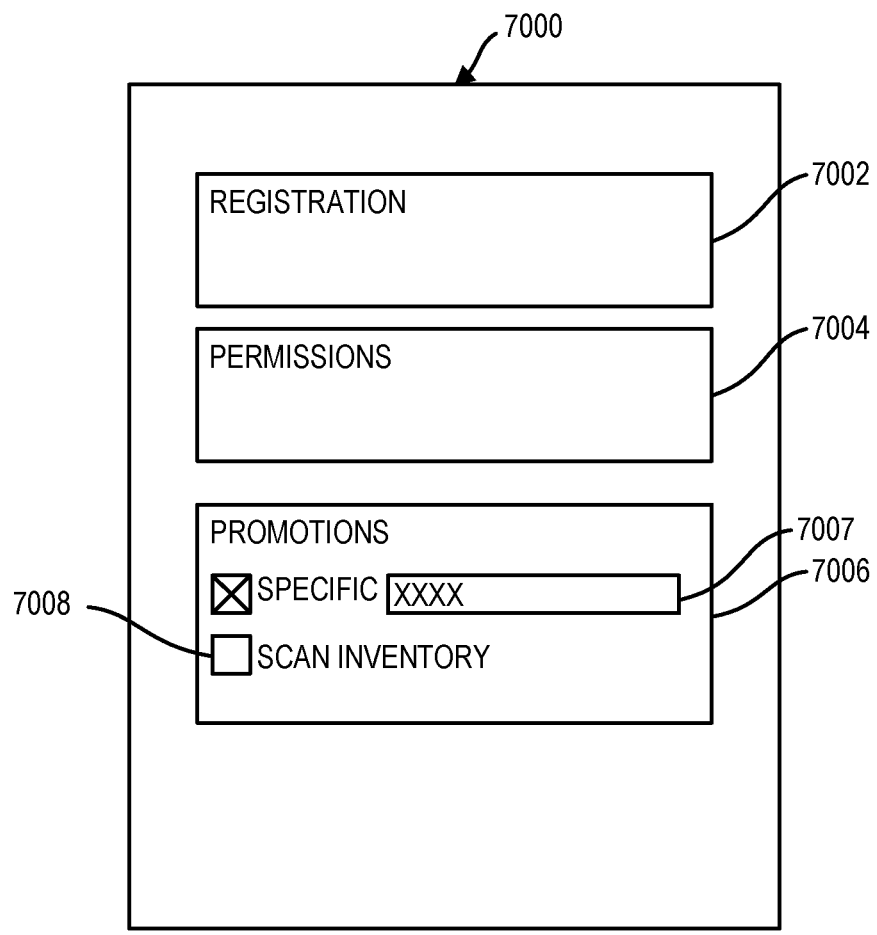
FIG. 7 depicts a supplier user interface according to one embodiment.

At block 1105 enterprise system 110 can send the received registration data and/or configuration data received at block 1104 to data repository 108 for receiving and storing by data repository at block 1082. In response to receipt of registration data from a supplier, enterprise system 110 at block 1104 can setup an account for a supplier and assign a UUID. Suppliers can enter registration data and/or configuration data using user interface 7000 as set forth in FIG. 7.

In registration area 7002 a supplier can enter registration data e.g. name, contact information, password, and the like. Registration data can include permissions data and permissions of the supplier can be defined with use of permissions area 7004 of user interface 7000. Permissions of supplier can include e.g. permissions that permit enterprise system 110 to examine inventory data of the supplier, so that an enterprise associated to enterprise system 110, such as an online retailer can monitor the availability of items which it advertises as being available to its customers such as customer users of client computer devices 130A-130Z.

According to one aspect herein, enterprise system 110 can prompt customer users of the enterprise associated to enterprise system 110 to engage with physical items at item venues 140A-140Z, e.g. retail stores operated by enterprises other than the enterprises associated to enterprise system 110. According to one embodiment, enterprise system 110 at block 1106 can be monitoring location data received specifying respective locations of respective client computer devices 130A-130Z to determine whether a customer user of an enterprise associated to enterprise system 110 has moved to a location of an item venue referenced in item venues area 2124. The location data received at block 1106 can specify e.g. a current coordinate location of respective users of system 100 and/or can specify whether respective users have breached a geofence associated to an item venue, e.g., in the case a client computer device of client computer devices 130A-130Z includes breach detection software which may have been installed at block 1302.

A geofence associated to an item venue can be configured according to one embodiment to be located on the walls defining an item venue building so that a user can receive prompting promotional data when entering a building defining an item venue. A geofence associated to an item venue can be configured according to one embodiment to be located a distance spaced apart and away from the walls defining an item venue building so that a user can receive prompting promotional data when entering a location in proximity with a building defining an item venue (so that the user may be prompted to visit the item venue).

At block 1107 enterprise system 110 can determine whether one or more customer user is at a location of an item venue referenced in item venues area 2124. In the case that no user is detected at an item venue location, enterprise system 110 can iteratively perform the loop of blocks 1106 and 1107 until a user is detected at a location of an item venue. In the case a customer user is detected at a location of an item venue, enterprise system 110 can proceed to block 1108.

At block 1108 enterprise system 110 can perform examining item provider data. An item provider herein can be regarded to be one or more of the enterprises associated to enterprise system 110, e.g., an online retailer and/or the suppliers associated to respective supplier enterprise systems 150A-150Z that supply items to the enterprise associated to enterprise system 110. Enterprise system 110 performing block 1108 can include enterprise system 110 activating provider item identification process 112 as set forth in reference to FIG. 1.

According to one embodiment, enterprise system 110 at block 1108 can include enterprise system 110 examining e.g. (a) configuration data provided by promotions data defined by an administrator user associated to the supplier e.g. using supplier user interface 7000; (b) inventory data associated to one or more supplier is stored in supplier inventory area 2129; and/or (c) data of enterprise inventory stored in enterprise inventory area 2127 of data repository 108. Enterprise system 110 can perform block 1108 with the block 1109.

At block 1109 enterprise system 110 can select one or more promotional item for promotion based on the examining item provider data block 1109. Enterprise system 110 performing block 1109 can include enterprise system 110 scoring candidate items, e.g., in one embodiment, the full set of all possible items for promotion using the scoring formula set forth in Eq. 1.

$$S = F_1 W_1 + F_2 W_2 + F_3 W_3 \quad \text{(Eq. 1)}$$

Where S is a desirability score for scoring the desirability of an item is an item for promotion, $F_1$ is a first factor contributing to the desirability score, $F_2$ is a second factor contributing to the desirability score, and $F_3$ is the third factor contributing to the desirability score, where weights $W_1$ to $W_3$ are weights associated to the respective factors $F_1$-$F_3$.

Referring to Eq. 1, factor $F_1$ can be a configuration data factor. Using user interface 7000 an administrator user of a supplier enterprise can specify configuration data defining promotions data. Promotions data can specify items for promotion. An administrator user of supplier user interface 7000 can use area 7006 to define configuration data provided by promotions data. Using area 7007 an administrator user can define configuration data to specify a specific item for promotion. Using promotions data area 7006 an administrator user associated to the supplier enterprise can use area 7008 to select the scan inventory option of area 7006. When the administrator user supplier selects the scan inventory option using area 7008, enterprise system 110 can be authorized to examine supplier inventory data of the supplier for selection of a desirable item for promotion.

Referring to Eq. 1, enterprise system 110 can assign a high value under factor $F_1$ in the case that an administrator user of the supplier specifies the item in area 7007 and can assign a low value under factor $F_1$ in the case that administrator user does not specify the item using area 7007. Referring to Eq. 1 factor $F_2$ can be a supplier inventory factor. Enterprise system 110 can assign a high value under factor $F_2$ in the case the items were stocked in inventory, e.g., as measured by threshold and an even higher value under factor $F_2$ if the item has been overstocked in supplier inventory for more than a threshold period of time. Factor $F_3$ can be an enterprise inventory factor. Enterprise system 110 can assign a high score under factor $F_3$ for an item when the item is overstocked in supplier inventory and can assign an even higher value under factor $F_3$ when the item has been overstocked for more than a threshold period of time.

At block 1109 enterprise system 110 can select N items of the candidate items for promotion using the scores returned for each candidate item based on Eq. 1. At block 1109 enterprise system 110 can select the highest one or more scoring items as the one or more item for promotion. On completion of block 1109 enterprise system 110 can proceed to block 1110.

At block 1110 enterprise system 110 can perform examining item venue inventory of item venues inventory area 2126, i.e. can examine inventory data of the item venue at the location at which the user is detected to be at block 1107. As explained with reference to FIG. 1, the inventory of an item venue can be an inferred inventory, e.g., not accurate, not complete, and without various data such as acquisition time data, supplier data, shipping data and the like.

Inventory data of item venues inventory area 2126 can be informal inventory data that is inferred. According to one embodiment, enterprise system 110 for determination of informal inferred inventory data associated to an item venue can query online data sources that specify top-selling items at geographical location of a venue for various item classifications. Enterprise system 110 performing examining item venue inventory at block 1110 can include enterprise system 110 activating redemption promotion generation process 113 as described in connection with FIG. 1.

Enterprise system 110 performing examining item venue inventory at block 1110 to examine item venue inventory can include enterprise system 110 examining data of item venue inventory area 2126 of data repository 108 as described in connection with FIG. 1. At block 1110 enterprise system 110 can perform identifying an item of an item venue for redemption promotion as set forth herein. Redemption promotion can be a promotion where a certain enterprise associated with enterprise system 110 promotes an item for acquisition by a certain user from a second enterprise other than the certain enterprise associated with enterprise system 110 and for the promotion, the certain user can receive a credit from the certain enterprise associated with enterprise system 110.

In response to performing block 1109 to select one or more item for promotion, and to performing block 1110, enterprise system can proceed to block 1111. At block 1111 enterprise system 110 can perform identifying an item specified within an item venue inventory subject to examining at block 1111. Enterprise system 110 performing identifying at block 1111 can include enterprise system 1111 identifying an item within the item venue inventory of the venue at which the user is determined to be at that is compatible with an item for promotion selected a block 1109.

Enterprise system 110 determining that an item of an item venue inventory is compatible with an item selected for promotion at block 1109 can include enterprise system 110 determining that item of the item venue inventory (as defined by data of item venues inventory area 2126) is of a common item classification with the items selected for promotion at block 1109. For example, enterprise system 110 can select the item GOLDSTAR Gourmet Cookies at block 1109 and can identify the item ACME Cookies at block 1111. Enterprise system 110 determining that an item of an item venue inventory is compatible with an item selected for promotion at block 1109 can include enterprise system 110 determining that the item from the item venue inventory is of a classification complementary with an item selected for promotion of block 1109. For example, enterprise system 110 can select the item BESTCUP Coffee at block 1109 and can identify the item ACME Cookies at block 1111. Examples of complementary items can include e.g. shoes and polish, computer hardware and computer software, printers and ink cartridges, pencils and erasers, game portals and DVDs of games, coffee and cookies, and the like. In response to completion of block 1111 enterprise system 110 can proceed to block 1112. Enterprise system 110 determining that an item of an item venue inventory is compatible with an item selected for promotion at block 1109 can include enterprise system 110 determining that the item from the item venue inventory is the same item selected for promotion of block 1109. For example, enterprise system 110 can select the item ACME Cookies at block 1109 and can identify the item ACME Cookies at block 1111.

At block 1112 enterprise system 110 can send promotional data for receipt by client computer device of client computer devices 130A-130Z. The promotional data sent at block 1112 can be promotional data that defines the text based promotion for display on a displayed user interface of a client computer device, e.g., on displayed user interface 6000 as explained with reference to FIG. 1. The promotional data center block 1112 can define the redemption promotion that prompts a user to acquire from an item venue, the item identified at block 1111. An example of item promotion can include text based content. An example of a redemption promotion is illustrated in FIG. 6 in redemption promotion area 6008. A redemption promotion can include e.g. text promotion as follows: "WE NOTICE THAT YOU ARE AT THE ABC INC. CONVENIENCE STORE AT 101 MAIN ST., ENJOY A BOX OF ACME CHOCOLATE CHIP COOKIES REGULAR SIZE WITH A 20% DISCOUNT ON US. WE WILL CREDIT YOUR ACCOUNT ON PURCHASE AT THE ABC STORE OF YOUR CURRENT LOCATION." The prompting data sent at block 1112 can prompt the user to acquire an item at the item venue at which the user is at.

At block 1113, enterprise system 110 can receive feedback data from the client computer device of the user determined to be the item venue location examined at block 1107. The user's client computer device can be iteratively sending feedback data at block 1305. The feedback data can include feedback data indicating, e.g. that the user has acquired by purchase, the item referenced in the promotional data sent at block 1112 or can include other feedback data such as survey data, which can be prompted for with the promotional data sent at block 1112. Each of purchase indicating feedback data and survey feedback data can be sent from client application installed on the client computer device at block 1302. The user can define survey feedback data by accessing the survey data with use of complete survey button of area 6008 of user interface 6000 (FIG. 6).

In response to receipt of feedback data at block 1113, enterprise system 110 can proceed to block 1114 and send the received feedback data received at block 1113 for storage in data repository 108 for storage into users actions area 2122. Data repository 108 can store received feedback data at block 1083.

In response to completion of block 1114, enterprise system 110 can proceed to block 1115 to receive feedback data from social media system 160 which can be iteratively sending feedback data to enterprise system 110 at iteratively performed block 1601. The feedback data received at block 1115 can include e.g. posts data which can be processed by enterprise system 110. On receipt of the posts data received at block 1115 the posts data can be subject to processing e.g. by NLP processing.

The feedback data received at block 1115 from social media system 160 can further include purchase acquisition data that indicates whether the user has purchased the item referenced in the promotional data sent at block 1112 as set forth herein. Social media system 160 can include an associated payment module that allows users to make payments to specified entities using social media system 160. In response to performing receiving block 1115 enterprise system 110 can proceed at block 1116 to send received feedback data received at block 1115 to data repository 108 for receipt and storage by data repository 108 at block 1084.

The feedback data received a block 1113 and/or block 1115 can include timeout data. For example, one or more of a client computer device or social media system 160 can be configured to send a timeout message, on the expiration of timeout that indicates that the user in response to receipt of promotional data block 1112 has not acquired the item referenced in the promotional data. The feedback data sent at block 1304 can include location data of the client computer device of the user determined to be at the referenced location associated to block 1107 and enterprise system 110 can determine inferentially that a user has declined to acquire the item referenced in the promotional data sent at block 1112 if, based on the examination of the received location data, enterprise system 110 determines that the user has exited the location of the item venue and therefore has decided not to acquire the item referenced in the promotional data sent at block 1112.

When a user performs purchasing of an item specified in promotional data sent at block 1112, the purchase transaction can be between the user and the certain enterprise operating the item venue referred to at block 1106, which can be e.g. item venue 140A (FIG. 1). The certain enterprise can be different from and unaffiliated with the enterprise of enterprise system 110. The user can make a purchase transaction at a checkout station defined by in venue system 142A of the item venue (FIG. 1). As a result of the purchase transaction, the certain enterprise associated to item venue 140A, in venue system 142A and enterprise system 143A can record the purchase transaction in its financial records maintained by a financial institution system of financial institution systems 180A-180Z. Enterprise system 180A associated to the enterprise that operates venue 140A, as a result of the purchase transaction, can adjust its inventory records to reflect the purchase. Where the purchase transaction is independent of the enterprise associated to enterprise system 110, enterprise system 110 as a result of the purchase transaction generating feedback data sent at block 1305 and block 1601 will not record the transaction in its financial records maintained in a financial institution system of financial institution systems 180A-180Z. Enterprise system 110 as a result of the purchase transaction producing feedback data sent at block 1305 and/or 1601 also will not make any adjustment to its own inventory data of enterprise inventory area 2127 and also may not make any adjustment to the item inventory data of item venues inventory area 2126. The inventory data of item venues inventory area 2126 can be inferred data that need not be complete or accurate (e.g. can be based on the assumption that an item venue will maintain a supply of top selling items according to one embodiment).

On completion of block 1116 enterprise system 110 can proceed to block 1117. At block 1117 enterprise system 110 can perform processing of the received feedback data received at block 1113 and block 1115 to determine a preference of the user in respect to an item classification of the item referenced in the promotional data sent at block 1112. Enterprise system 110 performing block 1117 can include enterprise system 110 employing Eq. 2 as follows.

$$P=PF_1W_1+PF_2W_2+PF_3W_3 \quad (Eq. 2)$$

Where P is the preference score for user for an item of the item classification specified in the promotional data sent at block 1112, $PF_1$ is a first preference factor, $PF_2$ is a second preference factor, $PF_3$ is a third preference factor, and $W_1$-$W_3$ are weights associated with the different preference factors. $PF_1$-$PF_3$. According to one embodiment, the first preference factor $PF_1$ can be a purchase factor. Enterprise system 110 can assign a higher score under factor $PF_1$, when the user acquires the item specified in the promotional data sent at block 1112 and can assign a lower score under factor $PF_1$ when the user does not acquire the item referenced in the promotional data sent at block 1112. The factor $PF_2$ can be a survey factor. Enterprise system 110 can assign a higher value under factor $PF_2$ where user completes survey data, specifying that the user prefers items of the item classification and can assign lower values under factor $PF_2$ where the user enters survey data, specifying that the user does not prefer the items of the item classification of the item referenced in the promotional data sent at block 1112. A user can enter text based user survey data with use of user interface 6000 as explained with reference to FIG. 6 in survey data area 6006. A user can also enter survey data in the case that promotional data sent at block 1112 defines survey questions presented to user on receipt of the promotional data sent at block 1112 by a user at a client computer device of the user. Regarding factor $PF_3$, factor $PF_3$ can be sentiment factor. Enterprise system 110 can process text based posts data from social media system 160 as explained in reference to block 1115 and can assign a higher score under factor $PF_3$, where the user expresses positive sentiment in reference to the item referenced in the promotional data sent at block 1112, and can assign lower value under factor $PF_3$, where the user expresses negative sentiment with respect to the item specified in the promotional data sent at block 1112. The sentiment data can be extracted by subjecting received feedback data received at block 1115 to NLP processing via activation of NLP process 115 (FIG. 1). According to one embodiment, Eq. 2 can include an additional one or more preference factor with an associated weight. According to one embodiment, such an additional preference factor can be an extraneous purchases factor that includes use of purchase data for item purchases of a user that are independent of promotional data herein. Enterprise system 110 can assign higher preference scores for an extraneous purchases factor for a certain item classification in dependence on the purchase activity of the user (higher values for more purchases, lower values for fewer purchases).

Performance of block 1117 by enterprise system 110 can include enterprise system 110 performing multiple queries on data repository 108 as indicated by query receive/respond block 1085 performed by data repository 108. In response to completion of block 1117 enterprise system 110 can proceed to block 1118 to determine whether the user determined to be at a location of an item venue at block 1107 is qualified to receive an item promotion for performance of block 1118. Enterprise system 110 can determine that a user is qualified to receive an item acquisition promotion referencing the item selected at block 1109 based on the preference score of the user determined using Eq. 2 exceeding a threshold. In response to qualification of the user at block 1118, enterprise system 110 can proceed to block 1119. At block 1119 enterprise system 110 can send promotional data for receipt by a client computer device of the user identified at block 1107 the client computer device can receive the promotional data sent at block 1119 at block 1306.

In response to enterprise system 110 determining that a user determined to be at an item venue location at block 1107 is qualified to receive promotional data enterprise system 110 can proceed to block 1119 and can send promotional data to the client computer device of the user for receipt by the client computer device of the user at block 1306. The promotional data sent at block 1119 can define item acquisition promotional data and can include, e.g. text based data, prompting the user to acquire, e.g., by purchase, an item made available by the enterprise associated to enterprise system 110, which can be an online retailer. An example of item acquisition promotional data is described with reference to user interface 6000 of FIG. 6.

Referring to customer user interface 6000 for display on a client computer device of a user, customer user interface 6000 can display an area 6010 an item acquisition promotion. The item acquisition promotion can include e.g. the text based content: "CLICK BELOW TO SIGN UP FOR A RECURRING ORDER OF GOLDSTAR GOURMET COOKIES AT 50% OFF". Comparing area 6010 to area 6008 of user interface 6000 it is seen that system 100 can drive item discoveries on the part of users so that preferences of such users can be learned and then satisfied efficiently by way of processes running on enterprise system 110. On completion of send block 1119 enterprise system 110 can proceed to block 1120. In the described example a supplier enterprise may want to run a promotion on the specialty cookies GOLDSTAR Gourmet Cookies and an administrator user of the supplier enterprise can define configuration specifying such a promotion using area 7007 of supplier user interface 7000. System 100 to identify a user interested in such cookies can activate a redemption promotion for items having a common (or complementary) classification with GOLDSTAR GOURMET COOKIES and examines feedback data to determine that a user has positive preference for the items of the common classification (which in the described example can be "baked goods" according to a generic classification, "cookies" according to a species classification).

At block 1120 enterprise system 110 can receive feedback data from client computer device of the user determined to be at the item venue location at block 1107. On receipt of the feedback data at block 1120 enterprise system 110 can proceed to block 1121 to send the received feedback data for receipt and storage by data repository 108 at block 1086. In response to completion of block 1121 enterprise system 110 can proceed to block 1122 to receive feedback data from social media system 160, which can be iteratively sending feedback data at block 1602. In response to completion of block 1122 enterprise system 110 can proceed to block 1123.

At block 1123 enterprise system 110 can send received feedback data received at block 1122 for receipt and storage by data repository 108 at block 1087. The feedback data received by enterprise system 110 at blocks 1120 and 1122 can have characteristics in common with the feedback data received by enterprise system 110 at blocks 1113 and 1115. The feedback data received at block 1120 can include, e.g., purchase acquisition data which indicates whether the user accepts the offer defined by the promotional data sent at block 1119 by accepting the offer by sending payment to the enterprise associated with enterprise system 110 through use of acquisition through use of the ORDER button in area 6010 of user interface 6000.

The feedback data received at block 1120 can also include completed survey data. For example, promotional data sent at block 1119 can include survey data defining data of an item survey that asks the user questions regarding the user's preference respecting the items selected at block 1109. The user can define survey feedback data by accessing the survey data with use of complete survey button of area 6010. Survey data can also include survey data defining preferences of the user entered using area 6006 of user interface 6000. Feedback data received at block 1122 can include feedback data defined by posts data posted on social media system 160.

On receipt of feedback data defined by posts data, enterprise system 110 can activate NLP process 115 to process the received feedback data in the form of post data to return sentiment parameter values associated to the post data. NLP processing can include topic extraction so that sentiment, parameter values, e.g., positive or negative sentiment parameters can be accurately associated to topics that are related to the promotional data sent at block 1119. The topic extraction processing can be accompanied by keyword processing. With use of topic and keyword processing, enterprise system 110 can accurately associate sentiments to topics and keywords that correspond to the promotional data sent at block 1119. In response to completion of block 1123, enterprise system 110 can proceed to block and proceed to block 1124.

When a user performs purchasing of an item specified in promotional data sent at block 1119, the purchase transaction can be between the user and the enterprise operating enterprise system 110. As a result of a purchase traction producing feedback data 1307 and block 1602, enterprise system 110 can record the purchase transaction in its financial records maintained by a financial institution system of financial institution systems 180A-180Z.

Feedback data received at block 1113 and block 1115 and at block 1120 and block 1122 can define action data of a user for storage into user actions area 2122 of data repository 108. At block 1124 enterprise system 110 can return to block 1101. It will be seen that enterprise system 110 can be iteratively completing the loop of blocks 1101 to 1124 throughout the course of deployment of enterprise system 110. In the iterative performance of the loop of blocks 1101-1124, enterprise system 110 can send a certain user redemption promotional data more than once on multiple instances. Multiple instances can include multiple instances of items of a certain common item classification, or of different item classifications, being promoted.

According to one embodiment enterprise system 110 can determine the user's preference score using Eq. 1 based on a single instance of feedback data, i.e. feedback data responsive to a certain single instance of promotional data. In another embodiment, enterprise system 110 for preference determination processing at block 1117 can use Eq. 3 as follows.

$$P = P_{AGG} = (\Sigma_{i=1}^{N} P_i)/N \qquad \text{(Eq. 3)}$$

Where a preference of a user, P, for user for a certain item classification is the aggregate preference of the user across a set of instances of preference data. According to Eq. 3 enterprise system 110 can aggregate preference scores associated to multiple ends associated to multiple instances of feedback data for determination of an aggregate preference score for a given item classification. In Eq. 3 an aggregate is based on a straight average. However, in another embodiment, the aggregate can be determined, e.g., by weighing more recent instances more heavily, and/or according to another embodiment data from aged instances of feedback data can be dropped. Using Eq. 3 it is seen that enterprise system 110 can store data and collect aggregate data on preferences of users over a plurality of instances for plurality of item classifications. Such data can define user profile data for storage and user profiles area 2123 of data repository 108.

Instances of feedback data for use in determining a user's preference with regard to an item can include use of feedback data received at blocks 1113 and 1115 in response to the sending of promotional data at block 1112 and also feedback data received at blocks 1120 and 1122 in response to the sending of promotional data at block 1119. That is, Eq. 2, for determination of a preference of a user for an instance of feedback data can use feedback data associated to item acquisition promotional data in addition to or in place of feedback data received in response to redemption promotional data as described in reference to Eq. 2 hereinabove. Using Eq. 2 to determine a preference score for user in response to receipt of item acquisition promotional data, enterprise system 110 can assign a higher value under factor $PF_1$ in the case that the user accepts the promotional offer of an item acquisition promotion and can assign a low score under factor $PF_1$ if the user does not accept the offer, e.g., as may be determined by a timeout flag being sent by a client computer device of the user whose location is detected at block 1107. Enterprise system 110 can assign a higher value under factor $PF_2$ of Eq. 2 in the case in dependence on content of survey feedback data and can assign a value under factor $PF_3$ of Eq. 2 in dependence on sentiment data which can be extracted from feedback data received from social media system 160 at block 1122.

Referring to the flowchart of FIG. 4, it can be seen that feedback data defined by a user in response to receipt of redemption promotional data (sent at block 1112) can determine whether the user will receive subsequent item acquisition promotional data as explained with reference to blocks 1117-1119. A user can receive item acquisition promotional data in dependence on feedback data received at block 1113 and/or block 1115. In some instances, preference determination at block 1117 which can determine that a user is qualified to receive promotional data sent at block 1119 can be based on multiple iterations of feedback data, e.g. the first instance of feedback data received in response to the promotional data sent at block 1112 and a second instance of feedback data received in response to the promotional data sent at block 1119 and feedback data received in response to a second instance of promotional data sent at block 1112, and so on.

Referring to block 1111, enterprise system 110 in some embodiments can perform filtering to exclude a user from receiving redemption promotional data as sent at block 1112. In some scenarios a user determined to be at a location of an item venue at block 1107 can be new user for which historical preference data has not been accumulated (in fact system 100 is well adapted for discovering and determining preferences of such user). In some scenarios a user determined to be at a location of an item venue at block 1107 can be a user for which substantial historical preference data has been previously collected defining profile data within user profiles area 2123. At block 1111 according to one embodiment enterprise system 110 can filter and exclude a user determined at block 1107 to be at a location of an item venue from receiving promotional data at block 1304 using Eq. 3 as set forth herein which Eq. 3 can be in dependence on historical preference data defining profiles data of profiles area 2123. Enterprise system 110 for performing the filtering determined at block 1111 can avoid sending prompting promotional data to the filtered and excluded user at block 1112. As to Eq. 3 enterprise system 110 can exclude the user from receiving a redemption promotion at block 1304 in the case that an aggregate preference of the user $P_{AGG}$ for the classification of the one or more item identified at block 1111 is below a threshold, T.

For lower values of T, preference score increasing feedback data received during a prior iteration of blocks 1113 and 1115 may be sufficient for qualifying the user at block 1111 even in the case of preference score decreasing feedback data being received during a prior iteration of feedback data receiving at block 1120 and block 1122. For higher values of T, preference score increasing feedback data may be needed during a prior iteration of blocks 1113 and 1115 and during a prior iteration of block 1120 and block 1122 in order to qualify a user at block 1111 to receive redemption promotional data at block 1304.

Embodiments herein recognize that feedback data of a user over multiple iterations of promotional data can determine whether enterprise system 110 at block 1112 will send promotional data to a user determined at block 1107 to be at a location of an item venue. Further it will be seen that a certain user can be expected to be traveling between a wide variety of locations of item venues 140A-140Z over the course of deployment of system 100. The different item venues can be operated by different enterprises such as different retailer enterprises. Accordingly, there is set forth herein according to one embodiment a method comprising responsive to a determination that a mobile client computer device is at a location of an item venue, sending to the client computer device prompting data, wherein the client computer device is associated to a user; examining feedback data defined by the user, wherein the feedback data is defined by the user in response to the prompting data; and transmitting to the mobile client computer device second prompting data in dependence on the examining feedback data defined by the user. There is also set forth herein the method wherein the sending, the examining and the transmitting are performed by an enterprise system of a first enterprise, wherein the item venue is an item venue of a second enterprise, wherein the prompting data prompts the user to acquire a first item from the second enterprise, wherein the second prompting data prompts the user to acquire a second item from a third enterprise, the third enterprise operating a second item venue, and wherein the enterprise system transmits the second prompting data to the client computer device in response to determining that the client user device is at a location of the second item venue.

In some embodiments, enterprise system 110 in performing filtering a user at block 1111 from receiving redemption promotional data at block 1304 can adapt promotional data for receipt at block 1304 in accordance with preferences of a user. For example, at block 1109, enterprise system 110 in performing selecting at block 1109 can identify J highest scoring items, e.g. using Eq. 1. For example, the J highest scoring items can be the items as shown in Table A.

TABLE A

| Row | Item | Promotion Desirability Score, S | User preference score, $P_{AGG}$, for item classification of the candidate Item for promotion |
|---|---|---|---|
| 1 | GOLDSTAR Gourmet Cookies | 0.978 | 0.483 |
| 2 | HAPPY Soda | 0.956 | 0.345 |
| 3 | MAGIC Potato Chips | 0.940 | 0.587 |
| ... | ... | ... | ... |

Enterprise system 110 according to one embodiment can be configured so that where a corpus of historical data is insufficient to establish a preference score for a user in an item category, enterprise system 110 can select the highest scoring item as the item for promotion without reference to preference data of the user. Where preference data of a user is available, enterprise system 110 can examine promotion desirability data e.g. the S score for an item as determined using Eq. 1 together with preference data of a user, e.g. the $P_{AGG}$ score for a user, in determining promotional data for sending at block 1112.

Referring to Table A, the highest scoring S score items in the illustrative example using Eq. 1 to determine promotion desirability are GOLDSTAR Gourmet Cookies, HAPPY Soda, and MAGIC Potato Chips in that order. Where preference data of the user is not available, enterprise system 110 can select the highest scoring item, GOLDSTAR Gourmet Cookies as the item for promotion. Where preference data of a user is available, enterprise system 110 can select an item for promotion using the S score and preference data of a user. According to one example, enterprise system 110 can qualify a selected item for promotion based on a preference score for the user in the item classification of the selected item exceeding a threshold e.g. T=0.5. Referring to Table A, enterprise system 110 can disqualify the items for promotion specified in Row 1 and Row 2, based on the preference score, $P_{AGG}$, for the user in the relevant item classification not exceeding the threshold, T=0.5. Enterprise system 110 in response to disqualifying the items of Row 1 and Row 2 can select the item of Row 3, MAGIC Potato Chips, based on the preference score for the user exceeding the threshold T=0.5 in the relevant item classification. The processing of Table A can assure that the user determined to be at a location of an item venue at block 1107 receives promotional data.

As explained hereinabove, promotional data sent by enterprise system 110 at block 1112 can be based on examining of item provider data at block 1108 and an examining of item venue inventory (which can be defined by item venue inventory data of item venues inventory area 2126) at block 1110. In another embodiment, an item referenced in the promotional data sent at block 1112 can be, e.g., randomly determined, predetermined, or otherwise determined without any examining of provider data such as item venue inventory data. In such an embodiment, data on preferences of users can advantageously be collected across classifications that are not dependent on provider data. Accordingly a broader scope of user preferences may be determined.

According to the method of the flowchart of FIG. 4, the sending of item acquisition promotional data by enterprise system 110 at block 1119 can be initiated based on an examination of provider data. For example, enterprise system 110 at block 1108 can perform examining of provider data to select (block 1109) one or more item for promotion. The examining of provider data at block 1108 can include e.g. examining of (a) supplier configuration data in which there can be specified a particular one or more item for promotion, (b) supplier inventory data, and/or (c) enterprise inventory data.

According to another embodiment, the sending of item acquisition promotional data by enterprise system 110 at block 1119, and/or the sending of redemption promotion data at block 1112 can be initiated based on an examination of user profile data stored in user profiles area 2123. After system 100 has been deployed, a substantial corpus of data can accumulate user profiles area 2123 defining user preferences across numerous item classification, e.g. specified by preference ratings on a scale of 0.0 (most negative preference) to 1.0 (most positive preference) across numerous item classifications. Preference data can be determined based on feedback data obtained at blocks 1113 and 1115 and/or at block 1120 and 1122. For the acquisition of feedback data, enterprise system 110 can send redemption promotional data at block 1112 including prompting data prompting a user to obtain items from an item venue operated by an enterprise other than an enterprise associated to enterprise system 110. The sending at block 1112 can be dependent on selected promotional item at block 1109 and also independent of a selected promotional item (enterprise system 110 can send promotional data at block 1112 randomly or otherwise for buildup of user profile data).

According to one embodiment, enterprise system 110 can run the method of the flowchart of FIG. 4. Enterprise system 110 can run the method 5000 illustrated in the flowchart of FIG. 5 in addition to or in place of the method illustrated in the flowchart of FIG. 4. According to one embodiment, enterprise system 110 can run the method of the flowchart of FIG. 4 and FIG. 5 concurrently.

Figure 5:
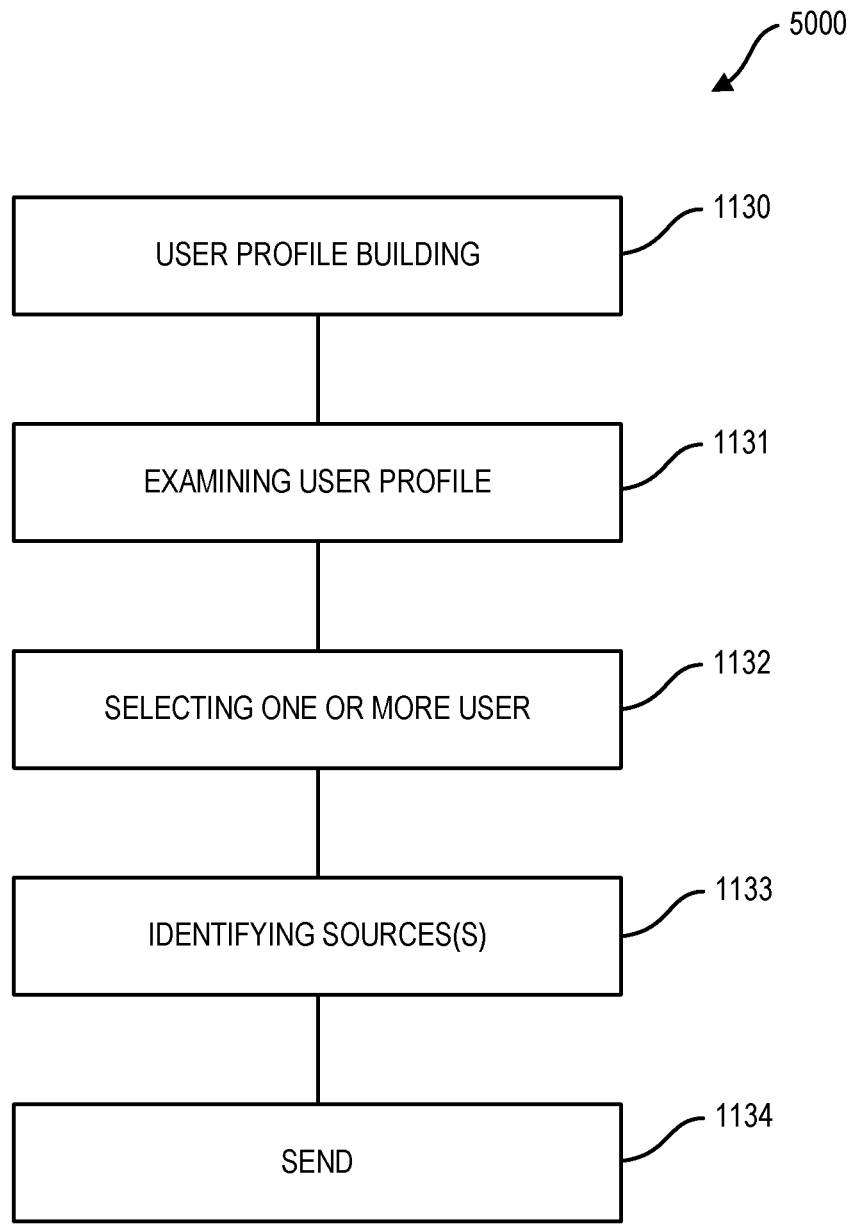
FIG. 5 is a flowchart illustrating a method for performance by an enterprise system according to one embodiment.

Referring to method 5000 of FIG. 5, enterprise system 110 at block 1130 can perform user profile building. For performing block 1130 enterprise system 110 can perform a plurality of iterations of blocks 1112-1116, and/or blocks 1119-1124, and with use of e.g. Eqs. 2 and Eq. 3 can return user preferences in the form of aggregate user preferences $P_{AGG}$ across a plurality of item classifications. User preference data defining user profiles can be stored in user profiles area 2123 of data repository 108.

At block 1131 enterprise system 110 can examine data defining user profiles of user profiles area 2123 and at block 1132 can perform selecting of one or more user based on the examining. In performing blocks 1131 and 1132 according to one embodiment, enterprise system 110 can compare preference ratings data to respective threshold and can identify users having threshold exceeding preference ratings according to one or more item classification. According to one embodiment, a preference rating can serve as a prediction as to a likelihood that a user will accept an offer of an item acquisition promotion. In performing blocks 1131 and 1132 according to one embodiment, enterprise system 110 can identify one or more user determined likely to accept an item acquisition promotional offer in one or more item classification.

On completion of block 1131, enterprise system 110 can proceed to block 1133. At block 1133 enterprise system 110 can identify source(s) to satisfy the preference(s) of the one or more user identified at block 1132. An identified source can be a certain supplier associated to one of supplier enterprise systems 150A-150Z or can be enterprise system 110 (based on existing enterprise inventory). When a certain supplier is identified as a source, enterprise system 110 can provide the item of an item acquisition promotion to a user from a set of items supplied by the certain supplier. To identify a supplier at block 1133 enterprise system 110 can examine one or more of (a) supplier configuration data to determine if a supplier has specified an item having an item classification in common with an item classification identified at block 1132 (a classification of a preferred user item), (b) supplier inventory data e.g. to confirm availability, and/or enterprise inventory data e.g. to confirm availability.

According to one embodiment, to identify a supplier at block 1133 enterprise system 110 can send a communication to multiple ones of respective suppliers associated to respective ones of supplier enterprise systems 150A-150Z. The communication can specify, according to the determination at block 1132, that a user has been identified as a likely acceptor of an item acquisition promotional offer in respect to an item of a certain item classification. The respective suppliers can send return data specifying their ability satisfy the indicated user preference. The communication to multiple suppliers at block 1133 can be a text based communication for display on user interface 7000 of FIG. 7 which can be displayed in promotions area 7006. User interface 6000 (FIG. 6) and user interface 7000 (FIG. 7) can be a webpage based user interface and enterprise system 110 can include a webpage server configured for serving such webpages.

The return data can include one or more parameter values specifying e.g. cost data and/or timing data of the supplier. The cost data can indicate cost required to the supplier for satisfying the identified user preference. The timing data can indicate the time frame in which the supplier can provide an item to the enterprise so that the enterprise can satisfy an acquisition by the user. Enterprise system 110 can examine the return data to select one supplier amongst multiple suppliers to whom the communication has been sent. The selection can be based on the cost data and/or the timing data (e.g. based on lowest cost and/or shortest time to complete acquisition by a user).

At block 1134 enterprise system 110 can send item acquisition promotional data to a client computer device of client computer devices 130A-130Z of a user identified at block 1132. The promotional data can specify an item of the item classification specified at block 1132, and the item (if the promotional data is accepted) can be sourced using a source identified at block 1133.

Embodiments herein set forth systems and methods for prompting interactions with physical items, using resulting feedback to determine user preferences, and to satisfying those preferences.

Embodiments herein recognize that if an existing supplier enterprise such as a manufacturer of items wants to promote a new item, they would provide value to an enterprise operating an item venue such as a retail store for item placement in their item venues. However, as item venues transition into online retailing for satisfying user need, the "value for placement" model is becoming less and less effective, since users are doing more and more of their acquisition of items online. Online item acquisition is saving consumers time, stress and gas money. Embodiments herein recognize that users are not discovering as many items e.g. products as they normally would if they shopped in a physical store. Embodiments herein recognize that both retailers and suppliers are seeking new ways to facilitate product discovery.

Embodiments herein can promote product discovery and can increase instances wherein a preference of a user is identified and satisfied on an ongoing basis e.g. by a user signing up for a recurrent order of an item. Methods herein can use individualized product incentives while a user is at a physical store. While a user enters a location of an item venue, enterprise system 110 can send a notification to the user with an incentive for a specific item e.g. retail store product. For example, a company such ACME might want to promote a new flavor of cookies, GOLDSTAR Gourmet Cookies. Enterprise system 110 can send the user first promotional data defined by an electronic coupon for free ACME cookies at ABC store (the user will receive a credit in the amount of the purchases if the user purchases at the ABC store) which the use is at and if the user likes them (as indicated by redeeming the coupon with a transaction with enterprise system 110 to obtain a credit from enterprise system 110 and its associated enterprise), the user will receive second promotional data defined by a discount offer on a recurring order, e.g. of ACME cookies or GOLDSTAR Gourmet cookies enterprise system 110. Enterprise system 110 can in some embodiments operate a certain item venue such as a retail store. System 100 can be configured according to one embodiment so that the user can pick up the item specified in the second promotional data at the certain item venue. System 100 can be configured according to one embodiment so that enterprise system 110 sends the second promotional data responsively to the user arriving at a location of the certain item venue.

Over time, the corpus of profile data that specifies user preferences will grow. Accordingly, item suggestions defined by promotional data can become more catered toward the user thus the user can become more likely to discover new items e.g. retail products they will like.

Certain embodiments herein may offer various technical computing advantages involved in computing advantages to address problems arising in the realm of computer networks and computer systems. Embodiments herein can include use of computer networks operating to provide location based services (LBS). According to one embodiment, a user's location can be monitored and when a user is determined to be at a location of an item venue, the user can be prompted to engage an item at the item venue. A computer system can be employed to track subsequent actions of the user in response to prompted for engagements of a user with respect to an item at an item venue. Embodiments herein can include use of Artificial Intelligence (AI) for determination of user preferences, and satisfaction of those preferences once those preferences are determined. Embodiments herein can include use of Artificial Intelligence (AI) for prompting user interactions with items. Certain embodiments herein may offer various technical computing advantages involving computing advantages to address problems arising in the realm of computer networks and particularly, computer networks operating to provide location based services (LBS). A fundamental aspect of operation of a computer system is its interoperation with entities with which it operates including human actors. By increasing the accuracy and reliability of information presented to human users, embodiments herein increase the level of engagement of human users for enhanced computer system operation. Embodiments herein can include user interface features e.g. wherein feedback data defined by a user can be actively and/or passively collected and subject to processing by a computer system based Artificial Intelligence (AI) platform for return of action decisions. For enhancement of computational accuracies, embodiments can feature computational platforms existing only in the realm of computer networks such as artificial intelligence platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 8:
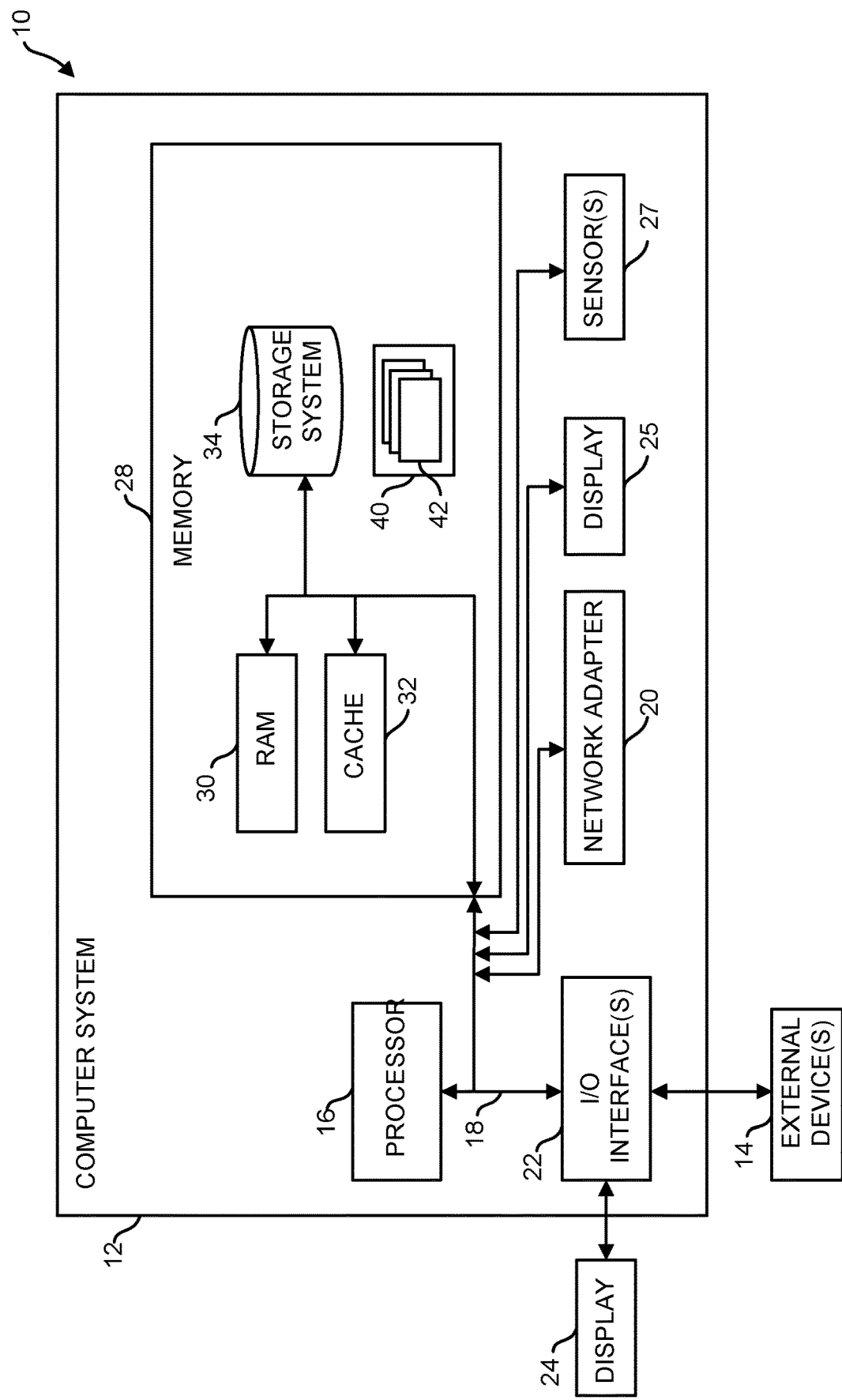
FIG. 8 depicts a computing node according to one embodiment.
Figure 9:
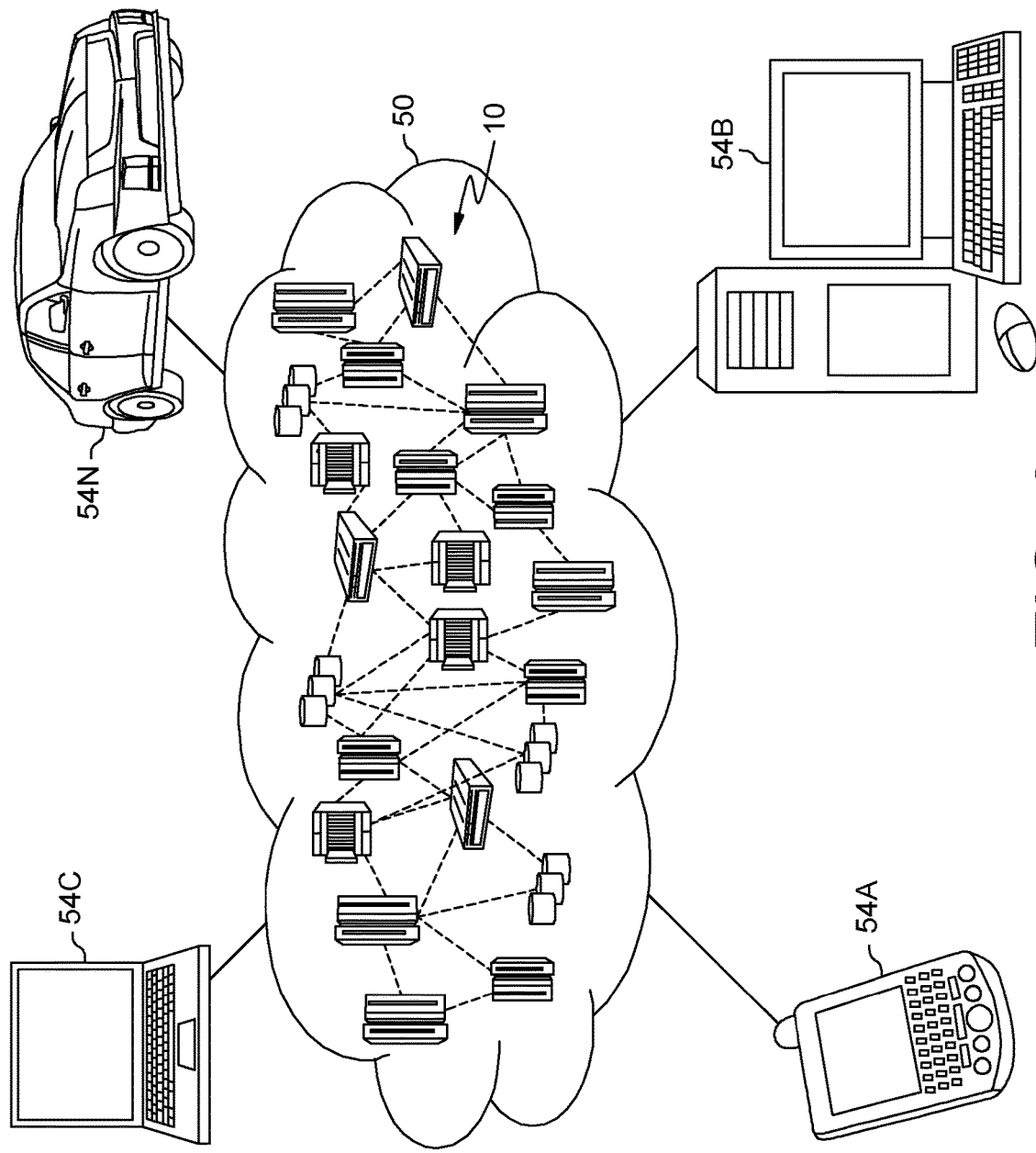
FIG. 9 depicts a cloud computing environment according to one embodiment.
Figure 10:
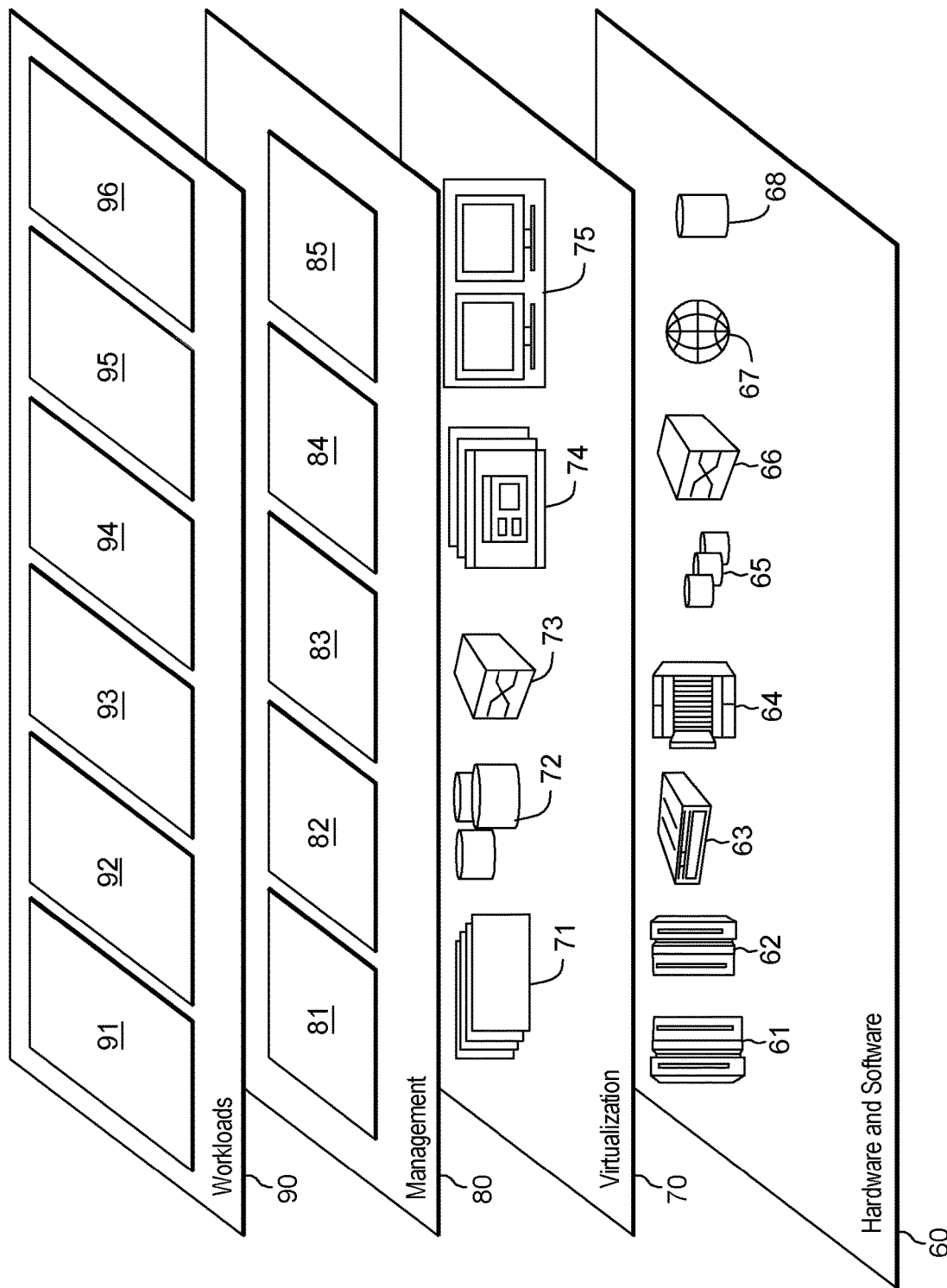
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, enterprise system 110 can include one or more computing node 10 and can include one or more program 40 for performing functions described with reference to method 200 of FIG. 2 and functions described with reference to enterprise 10 of FIG. 3 and functions described with reference to enterprise system 110 as set forth in the flowchart of FIG. 4 and functions described with reference to enterprise system 110 as set forth in the flowchart of FIG. 5. In one embodiment, one or more client computer device 130A-130Z can include one or more computing node 10 and can include one or more program 40 for performing functions described with reference to one or more client computer device 130A-130Z as set forth in the flowchart of FIG. 4. In one embodiment, supplier enterprise systems 150A-150Z can include one or more computing node 10 and can include one or more program 40 for performing functions described with reference to supplier enterprise systems 150A-150Z as set forth in the flowchart of FIG. 4. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for prompting user engagement with items as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
responsive to a determination that a mobile client computer device is at a location of an item venue, sending to the client computer device prompting data, wherein the client computer device is associated to a user;
examining feedback data defined by the user, wherein the feedback data is defined by the user in response to the prompting data, and wherein the feedback data includes data extracted using natural language processing from content provided by the user in response to the prompting data; and
transmitting to the mobile client computer device second prompting data in dependence on the examining feedback data defined by the user, wherein the sending, the examining and the transmitting are performed by an enterprise system of a first enterprise, wherein the item venue is an item venue of a second enterprise, wherein the prompting data prompts the user to acquire a first item from the second enterprise, wherein the second prompting data prompts the user to acquire a second item from the first enterprise.

2. A computer implemented method comprising:
responsive to determining that a mobile client computer device is at a location of an item venue, sending to the client computer device, by an enterprise system of a first enterprise, prompting data, wherein the client computer device is associated to a user, and wherein the item venue is an item venue of a second enterprise different than the first enterprise, wherein the prompting data prompts the user to acquire a first item from the second enterprise, the first item having a first item classification, wherein the prompting data includes textual data specifying the first item;
examining, by the first enterprise system of the first enterprise, feedback data defined by the user, wherein the feedback data is defined by the user in response to the prompting data that prompts the user to acquire the first item from the second enterprise and which includes the textual data specifying the first item, wherein the examining includes examining the feedback data to determine, by the enterprise system, preference data of the user, wherein the preference data determined by examining the feedback data specifies that the user positively prefers items of the first item classification;
generating, by the enterprise system, in dependence on the examining feedback data defined by the user, second prompting data using the preference data determined by examining the feedback data which specifies that the user positively prefers items of the first item classification, the second prompting data prompting the user to acquire a second item, the second item having an item classification compatible with the first item classification, wherein the second prompting data includes textual data specifying the second item; and
transmitting to the user the second prompting data in dependence on the examining feedback data defined by the user.

3. The method of claim 2, wherein the feedback data defined by the user in response to the prompting data includes data indicating that the user has acquired the first item referenced in the textual data specifying the first item, survey data completed by the user, and sentiment data of the user, wherein the survey data is in reference to items of the first item classification, and wherein the sentiment data of the user is extracted using natural language processing from social media post data provided by the user in response to the prompting data.

4. The computer implemented method of claim 2, wherein the determining that the mobile client computer device is at a location of the item venue includes determining, by processing data specifying a current location of the mobile client computer device, and geofence data of a data repository of the enterprise system, that the mobile client computer device has breached a geofence that specifies a location of the item venue, wherein the method includes analyzing inventory data of the item venue, wherein the inventory data of the item venue is inferred inventory data generated independent of shipment receipt data, and wherein generation of the inferred inventory data of the item venue includes performing a query of one or more data source to determine top M selling items of one or more item classification, wherein the method includes providing the prompting data in dependence on the analyzing inventory data of the item venue provided by the inferred inventory data, wherein the feedback data defined by the user in response to the prompting data includes data indicating that the user has acquired the first item referenced in the textual data specifying the first item, survey data completed by the user, and sentiment data of the user, wherein the survey data is in reference to items of the first item classification, and wherein the sentiment data of the user is extracted using natural language processing from social media post data provided by the user in response to the prompting data, wherein the sending, the examining and the transmitting are performed by an enterprise system of a first enterprise, wherein the item venue is an item venue of a second enterprise, wherein the prompting data is redemption prompting data which prompts the user to acquire a first item from the second enterprise at the item venue, wherein the second prompting data prompts the user to acquire a second item from the first enterprise, wherein the first item is a physical product item, and wherein the second item is a physical product item.

5. The computer implemented method of claim 2, wherein the feedback data defined by the user in response to the prompting data includes data indicating that the user has acquired the first item referenced in the textual data specifying the first item, wherein the examining the feedback data includes subjecting to natural language processing content provided by the user in response to the prompting data for extraction of a sentiment tag associated to the content, wherein the method includes identifying item venues by querying geo venue classifiers associated to venues, and wherein the first item is determined in dependence on a result of querying one or more data source to determine top selling items at a regional location of the venue for various item classifications.

6. The computer implemented method of claim 2, wherein the feedback data defined by the user in response to the prompting data includes data indicating that the user has acquired an item extracted data of the user, wherein the extracted data of the user is extracted using natural language processing.

7. The computer implemented method of claim 2, wherein the feedback data defined by the user in response to the prompting data includes data indicating that the user has acquired an item and sentiment data of the user, wherein the sentiment data of the user is extracted using natural language processing.

8. The computer implemented method of claim 2, wherein the feedback data defined by the user in response to the prompting data includes data indicating that the user has acquired the first item referenced in the textual data specifying the first item, and sentiment data of the user, and wherein the sentiment data of the user is extracted using natural language processing from content provided by the user in response to the prompting data.

9. A computer implemented method comprising:
responsive to a determination that a mobile client computer device is at a location of an item venue, sending to the client computer device prompting data, wherein the client computer device is associated to a user;
examining feedback data defined by the user, wherein the feedback data is defined by the user in response to the prompting data; and
transmitting to the mobile client computer device second prompting data in dependence on the examining feedback data defined by the user.

10. The computer implemented method of claim 9, wherein the sending, the examining and the transmitting are performed by an enterprise system of a first enterprise, wherein the item venue is an item venue of a second enterprise, wherein the prompting data prompts the user to acquire a first item from the second enterprise, wherein the second prompting data prompts the user to acquire a second item from the first enterprise.

11. The computer implemented method of claim 9, wherein the method includes responsive to a determination that a mobile client computer device is at a location of an item venue examining historical data of the user to determine preference data of the user, wherein the method includes sending by an enterprise system communications to first and second supplier enterprise systems, wherein the communications reference the preference data, wherein the method includes receiving response data from one or more of the first supplier enterprise system or the second supplier enterprise system and generating the prompting data in dependence on the response data.

12. The computer implemented method of claim 9, wherein the sending, the examining and the transmitting are performed by an enterprise system of a first enterprise, wherein the item venue is an item venue of a second enterprise, wherein the prompting data is prompting promotional data that prompts the user to acquire an item from the second enterprise within the item venue, wherein the examining includes examining the feedback data to determine, by the enterprise system, preference data of the user, wherein the method includes generating the second prompting data in dependence on the examining the feedback data.

13. The computer implemented method of claim 9, wherein the sending, the examining and the transmitting are performed by an enterprise system of a first enterprise, wherein the item venue is an item venue of a second enterprise, wherein the prompting data is prompting promotional data that prompts the user to acquire an item from the second enterprise within the item venue, wherein the examining includes examining the feedback data to determine, by the enterprise system, preference data of the user, the preference data specifying that the user positively prefers items of a certain item classification of the item, wherein the method includes generating, by the enterprise system, the second prompting data using the preference data, the second prompting data prompting the user to acquire a second item, the second item having an item classification compatible with the certain item classification.

14. The computer implemented method of claim 9, wherein the sending, the examining and the transmitting are performed by an enterprise system of a first enterprise, wherein the item venue is an item venue of a second enterprise, wherein the method includes examining provider data to identify an item for promotion, wherein the examining includes examining configuration data of an item supplier enterprise specifying at least one promoted item, the item supplier enterprise supplying items to the enterprise, wherein the method includes selecting the prompting data so that the prompting data specifies an item having an item classification in common with or complementary to an item classification of the item for promotion.

15. The computer implemented method of claim 9, wherein the sending, the examining and the transmitting are performed by an enterprise system of a first enterprise, wherein the item venue is an item venue of a second enterprise, wherein the method includes examining provider data to identify an item for promotion, wherein the examining includes examining configuration data of an item supplier enterprise specifying at least one promoted item, the item supplier enterprise supplying items to the enterprise, wherein the method includes selecting the prompting data so that the prompting data specifies an item having an item classification in common with or complementary to an item classification of the item for promotion, wherein the method included providing the second prompting data so that the second prompting data specifies the item for promotion.

16. The computer implemented method of claim 9, wherein the sending, the examining and the transmitting are performed by an enterprise system of a first enterprise, wherein the item venue is an item venue of a second enterprise, wherein the method includes examining provider data to identify an item for promotion, wherein the examining includes examining (a) configuration data of an item supplier enterprise specifying at least one promoted item, the item supplier enterprise supplying items to the enterprise, (b) inventory data of the supplier enterprise, and (c) inventory data of the first enterprise, wherein the method includes selecting the prompting data so that the prompting data specifies an item having an item classification in common with or complementary to an item classification of the item for promotion, wherein the method includes providing the second prompting data so that the second prompting data specifies the item for promotion.

17. The computer implemented method of claim 9, wherein the method includes examining historical data of the user to determine a preference of the user, and wherein the method includes providing the prompting data and the second prompting data in dependence on the examining historical data, wherein the sending, the examining and the transmitting are performed by an enterprise system of a first enterprise, wherein the item venue is an item venue of a second enterprise, wherein the prompting data is prompting promotional data that prompts the user to the acquire an item from the second enterprise within the item venue, wherein the examining includes examining the feedback data to determine, by the enterprise system, preference data of the user, wherein the method includes generating the second prompting data in dependence on the examining the feedback data.

18. The computer implemented method of claim 9, wherein the sending, the examining and the transmitting are performed by an enterprise system of a first enterprise, wherein the item venue is an item venue of a second enterprise, wherein the method includes examining inventory data of the item venue, wherein the inventory data of the item venue is inferred inventory data generated independent of shipment receipt data, and wherein generation of the inventory data of the item venue includes performing a query of one or more data source to determine top M selling items of one or more item classification, and wherein the method includes providing the prompting data in dependence on the examining inventory data of the item venue.

19. The computer implemented method of claim 9, wherein the sending, the examining and the transmitting are performed by an enterprise system of a first enterprise, wherein the item venue is an item venue of a second enterprise, wherein the method includes examining inventory data of the item venue, wherein the inventory data of the item venue is inferred inventory data generated independent of shipment receipt data, and wherein generation of the inventory data of the item venue includes performing a query of one or more data source to determine top M selling items of one or more item classification, wherein the method includes providing the prompting data in dependence on the examining inventory data of the item venue, wherein the method includes examining historical data of the user to determine a preference of the user, and wherein the method includes providing the prompting data and the second prompting data in dependence on the examining historical data, wherein the prompting data is prompting promotional data that prompts the user to acquire an item from the second enterprise within the item venue, wherein the examining includes examining the feedback data to determine, by the enterprise system, preference data of the user, wherein the method includes generating the second prompting data in dependence on the examining the feedback data.

20. The computer implemented method of claim 9, wherein the feedback data includes data extracted using natural language processing from content provided by the user in response to the prompting data.

* * * * *